(12) United States Patent
Brockers et al.

(10) Patent No.: US 11,866,198 B2
(45) Date of Patent: Jan. 9, 2024

(54) LONG-DURATION, FULLY AUTONOMOUS OPERATION OF ROTORCRAFT UNMANNED AERIAL SYSTEMS INCLUDING ENERGY REPLENISHMENT

(71) Applicant: California Institute of Technology, Pasadena, CA (US)

(72) Inventors: Roland Brockers, Pasadena, CA (US); Stephan Michael Weiss, Lenzburg (CH); Danylo Malyuta, Seattle, WA (US); Christian Brommer, Werne (DE); Daniel Robert Hentzen, Zurich (CH)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 410 days.

(21) Appl. No.: 16/667,655

(22) Filed: Oct. 29, 2019

(65) Prior Publication Data
US 2020/0130864 A1 Apr. 30, 2020

Related U.S. Application Data

(60) Provisional application No. 62/752,199, filed on Oct. 29, 2018.

(51) Int. Cl.
*B64F 1/36* (2017.01)
*B60L 53/12* (2019.01)
(Continued)

(52) U.S. Cl.
CPC .............. *B64F 1/362* (2013.01); *B60L 53/12* (2019.02); *B60L 53/14* (2019.02); *B64C 39/024* (2013.01);
(Continued)

(58) Field of Classification Search
None
See application file for complete search history.

(56) References Cited

U.S. PATENT DOCUMENTS 9,678,507 B1 * 6/2017 Douglas ............... G08G 5/0069
10,640,234 B1 * 5/2020 Douglas ............... B64C 39/024
(Continued)

OTHER PUBLICATIONS

DJI, "Flight Records Analysis Tutoria V1.0", Apr. 2018, DJI, p. 1-76 (Year: 2018).*
(Continued)

*Primary Examiner* — Jelani A Smith
*Assistant Examiner* — Davin Seol
(74) *Attorney, Agent, or Firm* — Gates & Cooper LLP

(57) ABSTRACT

A method and system provide the ability to autonomously operate an unmanned aerial system (UAS) over long durations of time. The UAS vehicle autonomously takes off from a take-off landing-charging station and autonomously executes a mission. The mission includes data acquisition instructions in a defined observation area. Upon mission completion, the UAS autonomously travels to a target landing-charging station and performs an autonomous precision landing on the target landing-charging station. The UAS autonomously re-charges via the target landing-charging station. Once re-charged, the UAS is ready to execute a next sortie. When landed, the UAS autonomously transmits mission data to the landing-charging station for in situ or cloud-based data processing.

30 Claims, 17 Drawing Sheets

(51) Int. Cl.
| | |
|---|---|
| B60L 53/14 | (2019.01) |
| B64C 39/02 | (2023.01) |
| G05D 1/00 | (2006.01) |
| B64F 5/60 | (2017.01) |
| B64D 47/08 | (2006.01) |
| B64U 10/13 | (2023.01) |
| B64U 30/20 | (2023.01) |
| B64U 101/00 | (2023.01) |
| B64U 101/30 | (2023.01) |

(52) U.S. Cl.
CPC .............. *B64D 47/08* (2013.01); *B64F 5/60* (2017.01); *G05D 1/0088* (2013.01); *B60L 2200/10* (2013.01); *B64U 10/13* (2023.01); *B64U 30/20* (2023.01); *B64U 2101/00* (2023.01); *B64U 2101/30* (2023.01); *B64U 2201/10* (2023.01)

(56) References Cited

U.S. PATENT DOCUMENTS

| | | | | |
|---|---|---|---|---|
| 2016/0070265 | A1* | 3/2016 | Liu | G01C 21/00 701/25 |
| 2016/0122038 | A1* | 5/2016 | Fleischman | B64C 39/024 244/114 R |
| 2017/0212529 | A1* | 7/2017 | Kumar | G01C 21/20 |
| 2017/0251179 | A1* | 8/2017 | Smolyanskiy | G02B 27/017 |
| 2017/0275023 | A1* | 9/2017 | Harris | H04N 13/271 |
| 2017/0315563 | A1* | 11/2017 | Wulff | B64C 27/82 |
| 2018/0010914 | A1* | 1/2018 | Hardt | G01C 21/16 |
| 2018/0114450 | A1* | 4/2018 | Glaab | G08G 5/0056 |
| 2018/0150970 | A1* | 5/2018 | Benini | G06T 7/73 |
| 2019/0033892 | A1* | 1/2019 | Gomez Gutierrez | B64D 31/06 |
| 2019/0039752 | A1* | 2/2019 | Venturelli | H02J 7/0044 |
| 2019/0197908 | A1* | 6/2019 | Mozer | B64U 70/00 |
| 2019/0233099 | A1* | 8/2019 | Lindsey | G05D 1/0202 |
| 2020/0290742 | A1* | 9/2020 | Kumar | B64D 27/10 |
| 2021/0031945 | A1* | 2/2021 | Inoshita | G05D 1/0676 |
| 2021/0191426 | A1* | 6/2021 | Yu | G05D 1/0858 |
| 2021/0278834 | A1* | 9/2021 | Kendoul | G05D 1/0022 |
| 2021/0302967 | A1* | 9/2021 | Ko | G05D 1/0214 |
| 2021/0319709 | A1* | 10/2021 | Rose | B64D 47/08 |
| 2021/0405654 | A1* | 12/2021 | Ulun | G05D 1/101 |

OTHER PUBLICATIONS

Scott Niekum, Feb. 9, 2017, "AR_TRACK_ALVAR", http://wiki.ros.org/ar_track_alvar (Year: 2017).*

Vidal, A. R., Rebecq, H., Horstschaefer, T., & Scaramuzza, D. (2018). Ultimate SLAM? Combining events, images, and IMU for robust visual SLAM in HDR and high-speed scenarios. IEEE Robotics and Automation Letters, 3(2), 994-1001 (Year: 2018).*

Lupashin, S., et al., "A platform for aerial robotics research and demonstration: The Flying Machine Arena", Mechatronics, 2014, pp. 41-54, vol. 24, No. 1.

Malyuta, D., "Guidance, Navigation, Control and Mission Logic for Quadrotor Full-cycle Autonomy", Master Thesis, 2018, ETH Zürich, Zürich, pp. 1-276.

"2050: A third more mouths to feed", Food and Agriculture Organization of the United Nations, 2009, http://www.fao.org/news/story/en/item/35571/icode/, as downloaded Feb. 1, 2021, pp. 1-5.

Richter, C., et al., "Polynomial Trajectory Planning for Aggressive Quadrotor Flight in Dense Indoor Environments", Springer International Publishing, 2016, pp. 649-666, vol. 114.

"Vision_landing", 2019, https://github.com/goodrobots/vision_landing, as downloaded Feb. 4, 2021, pp. 1-16.

"OpenCV: Camera Calibration and 3D Reconstruction", OpenCV, Oct. 24, 2017, https://docs.opencv.org/3.3.1/d9/d0c/group_calib3d.html, as downloaded Feb. 5, 2021, pp. 1-43.

"Rugged and Automatic Battery Charging for The Outdoor Environment", Skycharge, 2018, https://skycharge.de/charging-pad-outdoor, as downloaded Feb. 12, 2021, pp. 1-5.

"Research Opportunities in Space and Earth Sciences—2014", National Aeronautics and Space Administration (NASA) Headquarters Science Mission Directorate, Appendix A.41: Advanced Information Systems Technology, pp. 1-49.

Acikmese, B., et al., "Convex Programming Approach to Powered Descent Guidance for Mars Landing", Journal of Guidance, Control, and Dynamics, Sep.-Oct. 2007, pp. 1353-1366, vol. 30, No. 5.

Aldaher, S., et al., "Light-Weight Wireless Power Transfer for Mid-Air Charging of Drones", 2017 11th European Conference on Antennas and Propagation (EUCAP), pp. 336-340.

Davuluri, P., et al., "Radio Frequency Interference due to USB3 Connector Radiation", IEEE International Symposium on Electromagnetic Compatibility, 2013, pp. 632-635.

De Almeida, M. M., et al., "New Numerically Stable Solutions for Minimum-Snap Quadcopter Aggressive Maneuvers", American Control Conference (ACC), pp. 1322-1327.

Fiala, M., "ARTag, a fiducial marker system using digital techniques", IEEE Computer Society Conference on Computer Vision and Pattern Recognition (CVPR), 2005, pp. 1-7.

Grewal, M.S., et al., "Global Navigation Satellite Systems, Inertial Navigation, and Integration", 2007, pp. 1-591.

Jin, S., et al., "On-board Vision Autonomous Landing Techniques for Quadrotor: A Survey", Proceedings of the 35th Chinese Control Conference, Jul. 2016, pp. 10284-10289.

Mellinger, D., et al., "Minimum Snap Trajectory Generation and Control for Quadrotors", 2011 IEEE International Conference on Robotics and Automation, May 2011, pp. 2520-2525.

Mulgaonkar, Y., et al., "Autonomous charging to enable long endurance missions for small aerial robots", Micro-and Nanotechnology Sensors, Systems, and Applications VI, 2014, pp. 1-15.

Vicencio, K., et al., "Energy-Optimal Path Planning for Six-Rotors on Multi-Target Missions", IEEE/RSJ International Conference on Intelligent Robots and Systems (IROS), 2015, pp. 2481-2487.

Zarco-Tejada, P.J., et al., "Fluorescence, temperature and narrow-band indices acquired from a UAV platform for water stress detection using a micro-hyperspectral imager and a thermal camera", Remote Sensing of Environment, 2011, pp. 1-16.

Lynen, S., et al., "A Robust and Modular Multi-Sensor Fusion Approach Applied to MAV Navigation", 2013 IEEE/RSJ International Conference on Intelligent Robots and Systems, Nov. 2013, pp. 1-7.

Matthies, L., et al., "Stereo vision-based obstacle avoidance for micro air vehicles using disparity space", 2014 IEEE International Conference on Robotics & Automation (ICRA) Hong Kong Convention and Exhibition Center, May 31-Jun. 7, 2014, Hong Kong, China, pp. 3242-3249.

Shen, S., et al., "Autonomous Multi-Floor Indoor Navigation with a Computationally Constrained MAV", 2011 IEEE International Conference on Robotics and Automation Shanghai International Conference Center, May 9-13, 2011, Shanghai, China, pp. 20-25.

Mourikis, A.I., et al., "A Multi-State Constraint Kalman Filter for Vision-aided Inertial Navigation", Proc. of the IEEE Int. Conf. on Robotics and Automation, 2007, pp. 1-8.

Li, M., "Visual-Inertial Odometry on Resource-Constrained Systems", UC Riverside, UC Riverside Electronic Theses and Dissertations, 2014, pp. 1-225.

Achtelik, M., et al., asctec_mav_framework, http://wiki.ros.org/asctec_mav_framework, last edited Mar. 12, 2015, pp. 1-3.

April Laboratory, "AprilTags visual fiducial system", https://april.eecs.umich.edu/software/apriltag, as downloaded Dec. 28, 2020, pp. 1-3, Copyright 2010.

Bencina, R., "Improved topological fiducial tracking in the reacTIVision system", IEEE Computer Society Conference on Computer Vision and Pattern Recognition (CVPR), Jul. 2005, pp. 1-8.

Bergamasco, F., et al., "An Accurate and Robust Artificial Marker based on Cyclic Codes", IEEE Transactions on Pattern Analysis and Machine Intelligence, 2016, pp. 1-16, vol. 28, No. 12.

(56) References Cited

OTHER PUBLICATIONS

Blackmore, L., et al., "Minimum-landing-error powered-descent guidance for Mars landing using convex optimization", Journal of Guidance, Control, and Dynamics, Jul.-Aug. 2010, pp. 1161-1171, vol. 33, No. 4.

Borowczyk, A., et al., "Autonomous Landing of a Multirotor Micro Air Vehicle on a High Velocity Ground Vehicle", 20th IFAC World Congress, 2017, pp. 1-8.

Brescianini, D., et al., "Nonlinear quadcopter attitude control", Technical Report No. 009970340, Zürich: ETH Zürich, Departement Maschinenbau und Verfahrenstechnik, 2013, pp. 1-21.

Brockers, R., et al., "Autonomous landing and ingress of micro-air-vehicles in urban environments based on monocular vision", Proceedings of SPIE—The International Society for Optical Engineering 8031, 2011, pp. 1-12.

Brockers, R., et al., "Fully self-contained vision-aided navigation and landing of a micro air vehicle independent from external sensor inputs", Unmanned Systems Technology XIV, 2012, pp. 1-10, vol. 8387.

Brommer, C., et al., "Long- duration autonomy for small rotorcraft UAS including recharging", IEEE/RSJ International Conference on Intelligent Robots and Systems (IROS), 2018, pp. 7252-7258.

Burri, M., et al., "Real-Time Visual-Inertial Mapping, Re-localization and Planning Onboard MAVs in Unknown Environments", International Conference on Intelligent Robots and Systems (IROS), 2015, pp. 1872-1878.

Chaves, S.M, et al., "NEEC Research: Toward GPS-denied Landing of Unmanned Aerial Vehicles on Ships at Sea", Naval Engineers Journal, 2015, pp. 25-35, vol. 127, No. 1.

Devernay, F., et al., "Straight lines have to be straight", Machine Vision and Applications, 2001, pp. 14-24, vol. 13, No. 1.

Faessler, M., et al., "Thrust Mixing, Saturation, and Body-Rate Control for Accurate Aggressive Quadrotor Flight", IEEE Robotics and Automation Letters, 2017, pp. 476-482, vol. 2, No. 2.

Faessler, M., et al., "Automatic Re-Initialization and Failure Recovery for Aggressive Flight with a Monocular Vision-Based Quadrotor", IEEE International Conference on Robotics and Automation (ICRA), 2015, pp. 1722-1729.

Forster, C., et al., "Continuous on-board monocular-vision-based elevation mapping applied to autonomous landing of micro aerial vehicles", IEEE International Conference on Robotics and Automation (ICRA), 2015, pp. 111-118.

Forster, C., et al., SVO: Fast semi-direct monocular visual odometry, IEEE International Conference on Robotics and Automation (ICRA), 2014, pp. 15-22.

Furrer, F., "RotorS—A Modular Gazebo MAV Simulator Framework", Studies in Computational Intelligence, Jan. 2016, pp. 595-625, vol. 625.

"Drones: Reporting for work", Goldman Sachs, 2017, http:// www.goldmansachs.com/our-thinking/technology-drivinginnovation/drones/, as downloaded Jan. 28, 2021, pp. 1-22.

Hast, A., et al., "Optimal Ransac—Towards a repeatable algorithm for finding the optimal set", Journal of WSCG, 2013, pp. 1-10, vol. 21, No. 1.

Jin, P., et al., "Sensor Fusion for Fiducial Tags: Highly Robust Pose Estimation from Single Frame RGBD", IEEE/RSJ International Conference on Intelligent Robots and Systems (IROS), 2017, pp. 5770-5776.

Klein, G., et al., "Parallel Tracking and Mapping for Small AR Workspaces", IEEE and ACM International Symposium on Mixed and Augmented Reality, 2007, pp. 1-10.

Yang, S., et al., "An Onboard Monocular Vision System for Autonomous Takeoff, Hovering and Landing of a Micro Aerial Vehicle", J Intell Robot Syst, 2013, pp. 499-515, vol. 69.

Koenig, N., et al., "Design and Use Paradigms for Gazebo, An Open-Source Multi-Robot Simulator", IEEE/RSJ International Conference on Intelligent Robots and Systems (IROS), 2004, pp. 2149-2154.

Kyristsis, S., et al., "Towards Autonomous Modular UAV Missions: The Detection, Geo-Location and Landing Paradigm", Sensors, Nov. 2016, pp. 1-13, vol. 16, No. 11.

Ling, K., "Precision Landing of a Quadrotor UAV on a Moving Target Using Low-cost Sensors", Master's Thesis, University of Waterloo, Waterloo, 2014, pp. 1-69.

Morbidi, F., et al., "Minimum-Energy Path Generation for a Quadrotor UAV", International Conference on Robotics and Automation (ICRA), 2016, pp. 1492-1498.

Mueller, M.W., et al., "Critical subsystem failure mitigation in an indoor UAV testbed", 2012 IEEE/RSJ International Conference on Intelligent Robots and Systems, Oct. 7-12, 2012, pp. 780-785.

Mueller, M.W., et al., "A model predictive controller for quadrocopter state interception", 2013 European Control Conference (ECC), Jul. 17-19, 2013, pp. 1383-1389.

Mueller, M.W., et al., "A computationally efficient motion primitive for quadrocopter trajectory generation", IEEE Transactions on Robotics, 2015, pp. 1294-1310, vol. 31, No. 6.

Nissler, C., et al., "Evaluation and Improvement of Global Pose Estimation with Multiple AprilTags for Industrial Manipulators", IEEE International Conference on Emerging Technologies and Factory Automation (ETFA), 2016, pp. 1-8.

Olson, E., "AprilTag: A robust and flexible visual fiducial system", IEEE International Conference on Robotics and Automation (ICRA), 2011, pp. 3400-3407.

"SMC: The state machine compiler", 2017, http://smc.sourceforge.net/, as downloaded Jan. 28, 2021, p. 1.

Rublee, E., "ORB: an efficient alternative to SIFT or SURF", IEEE International Conference on Computer Vision (ICCV), 2011, pp. 2564-2571.

Suzuki, K.A.O., et al., "Automatic Battery Replacement System for UAVs: Analysis and Design", Journal of Intelligent and Robotic Systems, 2011, pp. 563-586, vol. 65, Nos. 1-4.

Toksoz, T., et al., "Automated Battery Swap and Recharge to Enable Persistent UAV Missions", American Institute of Aeronautics and Astronautics, 2011, pp. 1-10.

Valenti, M., et al., "Mission Health Management for 24/7 Persistent Surveillance Operations", AIAA Guidance, Navigation and Control Conference and Exhibit, 2007, pp. 1-18.

Vidal, A.R., et al., "Ultimate SLAM? Combining Events, Images, and IMU for Robust Visual SLAM in HDR and High-Speed Scenarios", IEEE Robotics and Automation Letters, Apr. 2018, pp. 994-1001, vol. 3, No. 2.

Vincent, J., "Google's Project Wing has successfully tested its air traffic control system for drones", https://www.theverge.com/2017/6/8/15761220/google-project-wing-drone-air-traffic-control-tests, as downloaded Jan. 28, 2021, pp. 1-4.

Wang, J., et al., "AprilTag 2: Efficient and robust fiducial detection", IEEE/RSJ International Conference on Intelligent Robots and Systems (IROS), 2016, pp. 4193-4198.

Weiss, S., et al., "Versatile Distributed Pose Estimation and Sensor Self-Calibration for an Autonomous MAV", IEEE International Conference on Robotics and Automation (ICRA), 2012, pp. 31-28.

"How it works", Wingtra, https://wingtra.com/, 2017, as downloaded Jan. 28, 2021, pp. 1-10.

Xu, A., et al., "Fourier Tag: A Smoothly Degradable Fiducial Marker System with Configurable Payload Capacity", 2011 Canadian Conference on Computer and Robot Vision, pp. 40-47.

"Amazon Prime Air's first customer delivery", Amazon, Dec. 14, 2016, https://www.youtube.com/watch?v=vNySOrl2Ny8, as downloaded Feb. 1, 2021, pp. 1-5.

Hausman, K., et al., "Self-Calibrating Multi-Sensor Fusion with Probabilistic Measurement Validation for Seamless Sensor Switching on a UAV", 2016 IEEE International Conference on Robotics and Automation (ICRA), 2016, pp. 4289-4296.

\* cited by examiner

LONG-DURATION, FULLY AUTONOMOUS OPERATION OF ROTORCRAFT UNMANNED AERIAL SYSTEMS INCLUDING ENERGY REPLENISHMENT

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 62/752,199, filed on Oct. 29, 2018, with inventor(s) Roland Brockers, Darren T. Drewry, Danylo Malyuta, Christian Brommer, and Daniel Hentzen, entitled "Long-Duration, Fully Autonomous Operation of Small Rotorcraft Unmanned Aerial Systems Including Recharging,".

This application is related to the following co-pending and commonly-assigned patent application, which application is incorporated by reference herein:

U.S. Provisional Patent Application Ser. No. 62/927,472, filed on Oct. 29, 2019, with inventors Roland Brockers and Daniel Robert Hentzen, entitled "Robust Precision Landing for Multirotor UAS,".

STATEMENT REGARDING FEDERALLY SPONSORED RESEARCH AND DEVELOPMENT

This invention was made with government support under Grant No. 80NM0018D004 awarded by NASA (JPL). The government has certain rights in the invention.

BACKGROUND OF THE INVENTION

1. Field of the Invention

The present invention relates generally to autonomous operation of unmanned aerial systems (UAS), and in particular, to a method, system, apparatus, and article of manufacture for operating a rotorcraft unmanned aerial system over long periods of time to execute long-duration fully autonomous missions including autonomous energy replenishment.

2. Description of the Related Art (Note: This application references a number of different publications as indicated throughout the specification by author/title names enclosed in brackets, e.g., [Smith]. A list of these different publications ordered according to these author/title names can be found below in the section entitled "References." Each of these publications is incorporated by reference herein.)

Background Overview

The Food and Agriculture Organization of the United Nations predicts that food production will have to increase by 70% by the year 2050 to feed a projected additional 2.2 billion people (Food & Agriculture Organization of the United Nations, 2009). Precision agriculture, also known as smart farming, is a data-driven approach that helps to address this challenge by using sensing technology to increase farming efficiency. Data are collected for variables like plant and animal health, crop yields, organic matter content, moisture, nitrogen, and pH levels. To complement sensors mounted on farming vehicles, fixed-wing and rotorcraft unmanned aerial systems (UAS) can be equipped with RGB, thermal and hyperspectral cameras, and flown over fields to create cost-effective and on-demand ortho-mosaic maps of biophysical parameters. The market for such robots is projected to be the second largest in the commercial drone sector (Goldman Sachs, 2017).

In addition, from processes at the leaf scale, the terrestrial biosphere exerts an enormous influence on the Earth's climate, which feeds back to ecosystem functioning and, ultimately, societal dependence on ecosystem productivity. The leaf scale, however, cannot be observed from space or manned aircraft with the spatial resolution and temporal frequency necessary to characterize plant behavior over the diurnal cycle. Such knowledge is critical to accurately assess plant physiology (photosynthesis, stress, and water use), One can measure most ecosystem properties with in situ instrumentation; however, these measurements are typically static point measurements, e.g. from the ground or towers, and provide very limited spatial coverage.

Recent progress on instrument miniaturization and UAV technology has enabled high spatial resolution thermal infrared (TIR) and visible-near infrared (VNIR) cameras on fixed and rotary wing [Zarco-Tejada] UAVs to fly with manual ground operations. However, these measurements cannot be made on a near continuous basis without constant human intervention, which makes observing diurnal cycle variations over long-durations and extensive regions impossible. UAVs with fully automated operation, including recharging, offer the ability to make regular, persistent; high spatial resolution measurements throughout the day to capture diurnal variability, which will make possible the accurate remote estimation of land surface fluxes, and contribute to our understanding of leaf-level properties and how they scale to the larger ecosystem.

The operations technology needed to enable this class of mission and to make it affordable is fully autonomous operation of UAV flight over several times per day over several months. A key aspect of this capability is the minimization of required human intervention for guidance or maintenance. Autonomous flight along preprogrammed trajectories is a capability that exists today, using GPS, inertial sensors, and visual feedback for position estimation [Lynen]. Executing repeated flights multiple times a day over a long period requires replenishing onboard energy storage and automated data downlink. This has been demonstrated in benign indoor settings with ideal state estimates aided by an external motion capture system [Mulgaonkar], but not in outdoor settings with highly variable illumination and weather conditions and potentially noisier state estimates. Moreover, docking for energy replenishment requires a precision landing approach in outdoor environments since onboard position estimates based on GPS are not accurate enough for pin-point landing on an energy replenishment station.

The simplest mission scenario has no obstacles and assured UPS reception; more advanced scenarios include flight where obstacles could be encountered or where GPS reception is poor, such as below tree-top level in forested areas [Matthies].

In view of the above, rotorcraft UAS are ideal assets for deploying sensors and instruments in a 3D environment. Because they can hover and fly slowly, and perform vertical take-off and landing (VTOL) which greatly simplifies the energy replenishment procedure, rotorcraft enable pin-point data gathering and can be operated in dense environments such as under tree canopies that are inaccessible to traditional fixed-wing platforms. In the agricultural domain, an important application is the repeated acquisition of the same target to capture changes in environmental properties such as plant water usage over the diurnal cycle. This is of increasing importance for ecosystem monitoring applications where accurate measurements of plant health parameters are desired down to leaf-level resolution of individual plants.

To validate the feasibility of UAS remote sensing of relevant data at high spatial resolutions, extensive data acquisition trials were carried out in collaboration with NASA's Jet Propulsion Laboratory environmental scientists. FIGS. 1A and 1B show a hexarotor with a six-band visible and near-infrared camera and a thermal infrared camera payload that was used during several campaigns at the West Side Research and Extension Center at Five Points, California, to capture the diurnal cycle of plant water usage. FIG. 1C illustrates a stitched map of the normalized difference vegetation index (NDVI) as an example data product of one flight. The map's pixel resolution of approximately 5 cm is beyond what can be currently achieved with orbital or traditional airborne instruments. Specifically, FIG. 1A shows an example deployment of a hexacopter UAS (e.g., a Turboace Infinity 6 UAS with sensor), FIG. 1B shows a hyperspectral camera (e.g., a Tetracam Micro-MCA on a gimbal), and FIG. 1C shows collected data for NDVI calculations with centimeter accuracy. The autonomy engine of embodiments of the invention can be deployed on such a quadrotor.

To better understand the problems with the prior art, a description of related work in the ability to replenish energy for long-duration autonomy and vision-based precision landing may be useful.

Long-Duration Autonomy

Several rotorcraft UAS that are capable of autonomous, long-duration mission execution in benign indoor environments with motion capture systems (e.g. VICON) used for navigation and control have previously appeared in literature. Focusing on the recharging solution to extend individual platform flight time and a multiagent scheme for constant operation, impressive operation times have been demonstrated ([Valenti]: 24 hr single-vehicle experiment) and ([Mulgaonkar]: 9.5 hr with multiple vehicles). Recharging methods vary from wireless charging ([Aldhaher]) to contact-based charging pads ([Mulgaonkar]) to battery swap systems ([Toksoz] and [Suzuki]). While wireless charging offers the most flexibility since no physical contact has to be made, charging currents are low resulting in excessively long charging times and are hence not an option for quick redeployment. However, interesting results have been shown in ([Aldhaher]) demonstrating wireless powering of a 35 g/10 W micro drone in hover flight. On the other end of the spectrum, battery swap systems offer immediate redeployment of a UAS, but require sophisticated mechanisms to be able to hot swap a battery, and a pool of charged batteries that are readily available.

Vision Based Landing

Embodiments of the invention may utilize a downward-facing monocular camera to detect and estimate the pose of the landing pad in the world frame for pin point landing. A monocular camera may be the cheapest, most lightweight and power efficient sensor choice. Alternatively, GPS and RTK-GPS systems suffer from precision degradation and signal loss in occluded urban or canyon environments ([Jin 2016]). Laser range finder systems are heavy and consume considerable amounts of energy. Further, stereo camera setups have limited range as a function of their baseline versus vehicle-to-pad distance.

Several landing approaches exist in literature for labeled and unlabeled landing sites. [Yang] presents a monocular visual landing method based on estimating the six-degree-of-freedom pose of a circled H marker. The same authors extend this study to enable autonomous landing site search by relaxing the landing site structure to an arbitrary but feature-rich image, that is matched using the ORB algorithm [Rublee]. [Forster 2014 and 2015] use SVO to estimate motion from a downfacing monocular camera to build a probabilistic two-dimensional elevation map of unstructured terrain and to detect safe landing spots based on a score function. [Brockers 2011 and 2012] develop a fully self-contained visual landing navigation pipeline using a single camera. With application to landing in urban environments, the planar character of a rooftop is leveraged to perform landing site detection via a planar homography decomposition using RANSAC to distinguish the ground and elevated landing surface planes.

However, landing algorithms which build elevation maps and perform generic landing spot detection trade their robustness for the ability to land in unlabeled environments. By placing visual fiducial markers at or near the landing zone, one can use visual fiducial detector algorithms to estimate the landing pad pose more reliably, that is, with less false positives and negatives.

Currently one of the most popular visual fiducial detectors and patterns is the AprilTag algorithm [Olson] which is renowned for its speed, robustness, and extremely low false-positive detection rates. The algorithm was updated by [Wang] to further improve computational efficiency and to enable the detection of smaller tags. AprilTag has been applied multiple times for MAV landing [Borowczyk]. [Brommer], [Chaves], [Wolcott], [Ling], and [Kyristsis]. Similar visual fiducials are seen around the landing zones of both Amazon and Google delivery drones [Amazon], [Vincent] as well as of some surveying drones [Wingtra].

In view of the above, wheat is needed is a method to operate a rotorcraft unmanned aerial system (UAS) over long periods of time to execute long-duration fully autonomous missions, including autonomous energy replenishment.

SUMMARY OF THE INVENTION

Because the typical flight endurance of a rotorcraft system with payload is relatively short (typically 10-20 min), long-term operation currently requires humans in the loop for energy replenishment (e.g., battery exchange and charging). This makes continuous observations over long periods of time impractical. To solve this issue, embodiments of the invention propose a system that is capable of fully autonomous repeated mission execution, including automated recharging to replenish its batteries after a data collection flight is completed.

Embodiments of the invention provide for the outdoor deployment of a high-level autonomy software that is executed onboard the UAS and which implements the capability of robust fully autonomous repeated data acquisition. This includes flight control for take-off, mission execution, and landing, state estimation, system health monitoring, the execution of emergency behaviors, recharging, and mission data handling. Once the autonomy software (autonomy engine) is started, the system has the logic and software-hardware interfaces necessary to operate indefinitely without humans in the loop.

Embodiments of the invention are human-independent and operate outdoors. In this regard, the prior art fails to provide rotorcraft-type UAS platforms capable of autonomous recharging that have been flown outdoors for extended periods of time. Hence, prior work that demonstrates UAS recharging has relied on the idealistic state estimation accuracy offered by indoor motion capture systems. Since GPS-only localization is not sufficiently accurate for precision landing on a charging pad, embodiments of the invention augment the sensor suite with a monocular camera. In this context, embodiments provide an extensive analysis seeking to find a landing pad fiducial marker layout that maximizes landing accuracy. Embodiments of the invention may also use beacons in the vicinity of the landing-charging station (e.g. Ultra Wide Band radio transmitters) for homing purposes in GPS-denied environments.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1C:
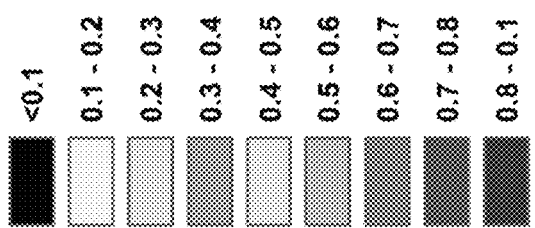
FIG. 1C shows processed data from UAS deployment for calculations with centimeter accuracy in accordance with one or more embodiments of the invention.
Figure 1C:
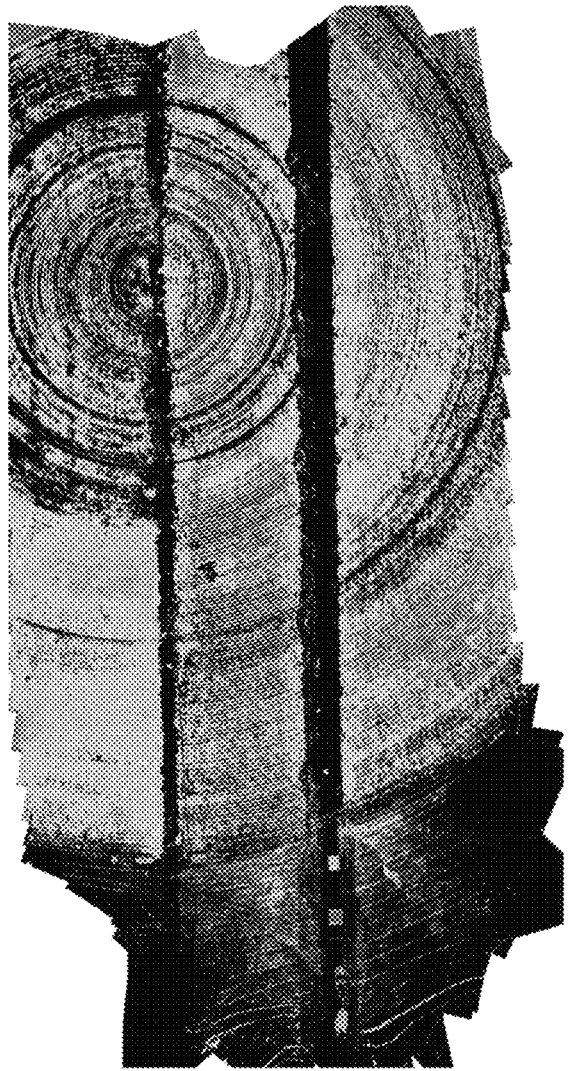
Figure 1A:
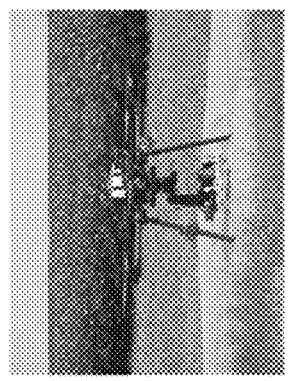
FIG. 1A shows an example deployment of a hexacopter UAS in accordance with one or more embodiments of the invention.
Figure 1B:
FIG. 1B shows a hyperspectral camera in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Objectives

Embodiments of the invention satisfy one or more of the following objectives:

(a) Developing an autonomy operation capability that is capable of operating a small unmanned aerial vehicle (UAV) for extended durations in outdoor environments that includes autonomous recharging, mission planning and execution, and emergency behaviors.

(b) Developing and evaluating autonomous landing and recharging capability for outdoor operation of a small unmanned aerial vehicle (UAV). In other words, a capability to recharge on a prepared landing pad that is robust to outdoor lighting variations and to winds up to at least 20 mph. Success in this application will pave the way for similar capabilities for recharging rotary wing aircraft in planetary missions;

Combining the above results demonstrate the ability to conduct autonomous sorties/long-term missions of high-frequency data-collection flights over extended period of times, in environments with or without good GPS reception.

General Overview

To meet the objectives and overcome the prior art problems set forth above, embodiments of the invention propose a system that is capable of fully autonomous repeated mission execution, including automated recharging to replenish its batteries after a data collection flight is completed. Embodiments of the invention provide for the outdoor deployment of a high-level autonomy engine that is executed onboard the UAS and which implements the capability of robust fully autonomous repeated data acquisition. This includes flight control for take-off and landing, state estimation, system health monitoring including the execution of emergency behaviors, recharging, and mission data handling. Once the autonomy engine is started, the system has the logic and software-hardware interfaces necessary to operate indefinitely without humans in the loop.

Embodiments of the invention improve over the prior art of [Kyristsis], and [Ling] in various manners including by using a bundle of several tags for improved landing pad pose measurement accuracy. [Borowczyk] and [Chaves] appear to also use a tag bundle; however, they deal with a moving landing platform and feed individual tag pose detections into a Kalman filter. Embodiments of the invention further desire to utilize a perspective-n-point solution to obtain a single-pose measurement using all tags at once.

After obtaining raw tag pose estimates (e.g., based on/from the AprilTag detector), embodiments of the invention use a recursive least squares (RLS) filter to obtain a common tag bundle pose estimate. A relevant previous work on this topic is [Nissler] in which a particle filter is applied to raw tag detections and RLS is compared to RANSAC for bundle pose estimation. Because the demonstrated accuracy improvement is marginal (about 1 cm in mean position and negligible in mean attitude) and RANSAC has disadvantages like ad hoc threshold settings and a nondeterministic runtime, embodiments of the invention utilize RLS for its simplicity. Nevertheless, RANSAC and its more advanced variations [Hast] can be substituted/utilized in one or more embodiments.

Embodiments of the invention are not limited to AprilTags, which can be substituted or combined with other markers for specific applications. A vast number of markers is available targeting different use-cases ([Fiala], [Jin 2016], [Olson], and [Yang]). Patterns include letters, circles, concentric circles and/or polygons, letters, two-dimensional barcodes, and special patterns based on topological ([Bencina]), detection range maximizing ([Xu]), and blurring/occlusion robustness considerations ([Bergamasco]).

System Overview

Figure 2:
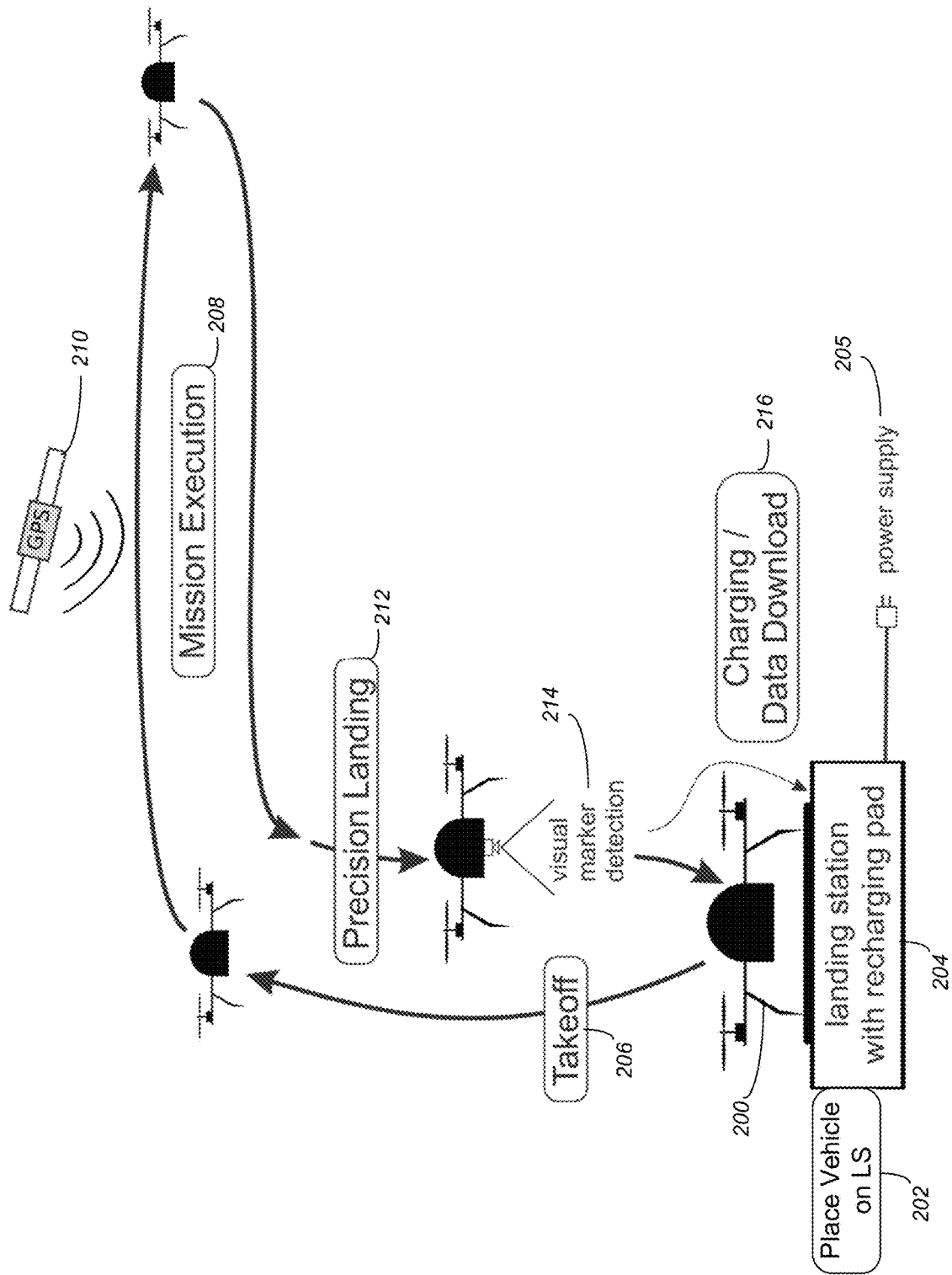
FIG. 2 illustrates an autonomous UAS data acquisition cycle in accordance with one or more embodiments of the invention.

Embodiments of the invention consists of two major components: the aerial vehicle with its onboard autonomy software (autonomy engine) and a landing station which integrates a charging pad, a base station computer for downloading data, and a wireless router for communication with the UAS while landed. FIG. 2 illustrates an autonomous UAS data acquisition cycle in accordance with one or more embodiments of the invention. As illustrated, at step 202, the vehicle/UAS 200 is placed on or near a landing station 204 (connected to a power supply 205) to start the operation.

After providing a mission profile, a start command commences the operation of the system. All actions of the UAS from then on are fully autonomous with no human involvement. At step 206, the vehicle 200 takes off to a safe altitude. At step 208, the mission is executed (e.g. using GPS 210 [Global Positioning System]). The autonomy engine implements various mission specific behaviors to guide the vehicle, including health monitoring and emergency response.

At step 212, a vision-based precision landing is performed (e.g., using visual marker detection 214 and/or a combination of GPS 210 and the visual marker detection 214). At step 216, the vehicle 200 is recharged and data downloading (e.g., of the information collected during mission execution 208) occurs.

Figure 3:
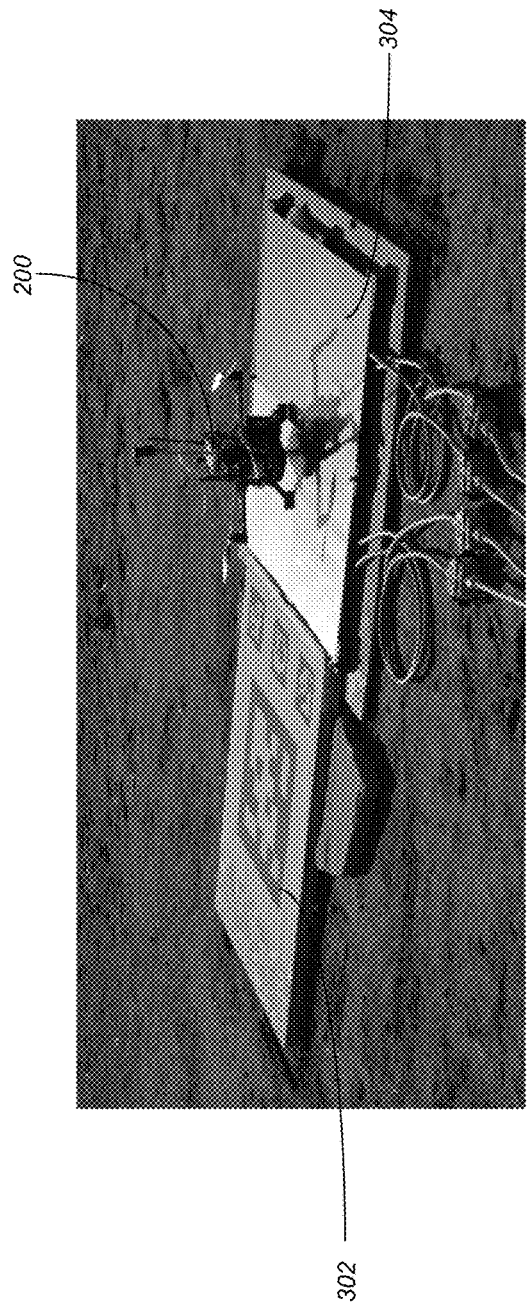
FIG. 3 illustrates a landing station with visual bundle, a charging pad, and a UAS in accordance with one or more embodiments of the invention.

FIG. 3 illustrates a landing station with visual bundle 302, a charging pad 304, and a UAS 200 in accordance with one or more embodiments of the invention. The recharging process starts automatically when the rotorcraft/UAS 200 makes contact with the charging surface 304.

UAS Hardware Architecture

A variety of different UAS may be used in accordance with embodiments of the invention. For example, the UAS may be a modified ASCTEC PELICAN vehicle.

Figure 4:
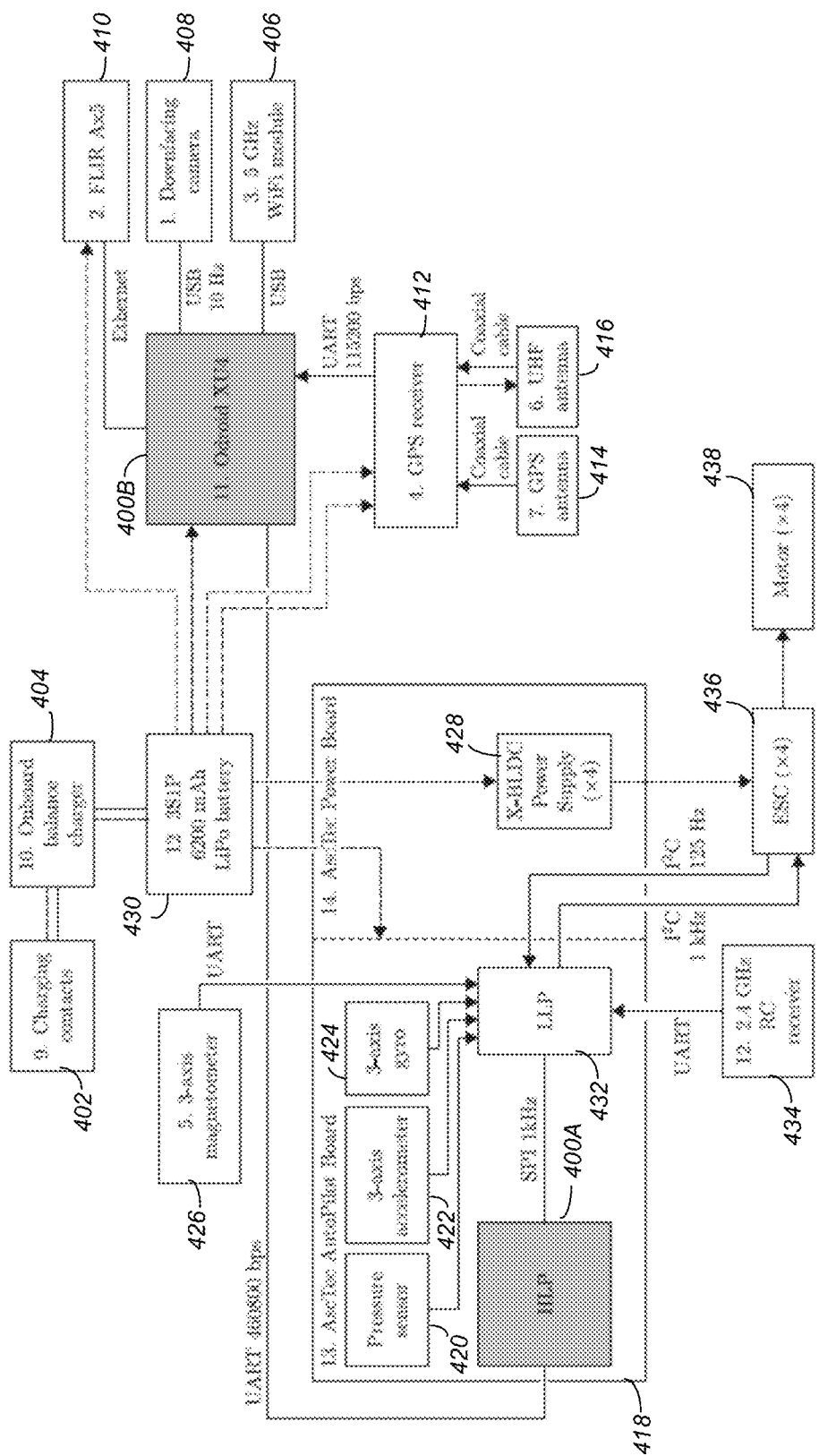
FIG. 4 illustrates a UAS onboard hardware architecture in accordance with one or more embodiments of the invention.

FIG. 4 illustrates a quadrotor onboard hardware architecture in accordance with one or more embodiments of the invention. Solid lines represent information flow and are labeled whenever the communication protocol is known, and dashed lines represent energy flow. The gray blocks in FIG. 4 label the components 400 (e.g., HLP 400A and/or 11. Odroid XU4 400B) that host the flight software (collectively referred to as software components 400).

To minimize recharging time, a contact-based, commercially available charging solution (e.g., [Skysense]) may be utilized to provide ample charging current to the onboard charging electronics. The charging pad 304 consists of an array of individual contact patches 402 that cover a 90×90 cm flat area. Charging is triggered by the charging pad electronics once contact to the charger onboard the UAS (e.g., onboard balance charger 404) is made via leg contacts. Charging status is monitored online by the autonomy engine, which prepares for the next flight once the battery is sufficiently charged. While landed, the vehicle 200 connects to the base station computer via WiFi 406 to downlink mission data and to receive eventually updated mission plans (e.g., mission-end commands from a user, or mission updates based on environmental data (e.g., weather forecast)).

As illustrated, the vehicle 200 may include or be communicatively coupled to a downfacing camera 408 as well as an infrared camera 410 (e.g., a FLIR Ax5 infrared camera). A GPS receiver 412 may receive data from a GPS antenna 414 and/or a UHF antenna 416 to assist in navigation via flight software. Additionally, the autopilot board 418 may include and/or receiver information from various sensors such as pressure sensor 420, accelerometer 422 (e.g., a 3-axis accelerometer), gyroscope 424 (e.g., a 3-axis gyro), and magnetometer 426. A universal asynchronous receiver transmitter (UART) 428 (e.g., UART 460800 bps) may be used to transmit the data between components 400 hosting the software. In addition, a power supply 428 and battery 430 may be used to charge the vehicle 200 via the onboard balance charger 404 and charging contacts 402. The software is also used to control a low level processor (LLP) 430 that receives data from the sensors 420-426, RC (radio-controlled) receiver 434, and ESC 436 (electronic speed control) which is used to drive the motor 438 of the vehicle 200 (e.g., the 4 rotors of the quadrotor).

Software Architecture

Figure 5:
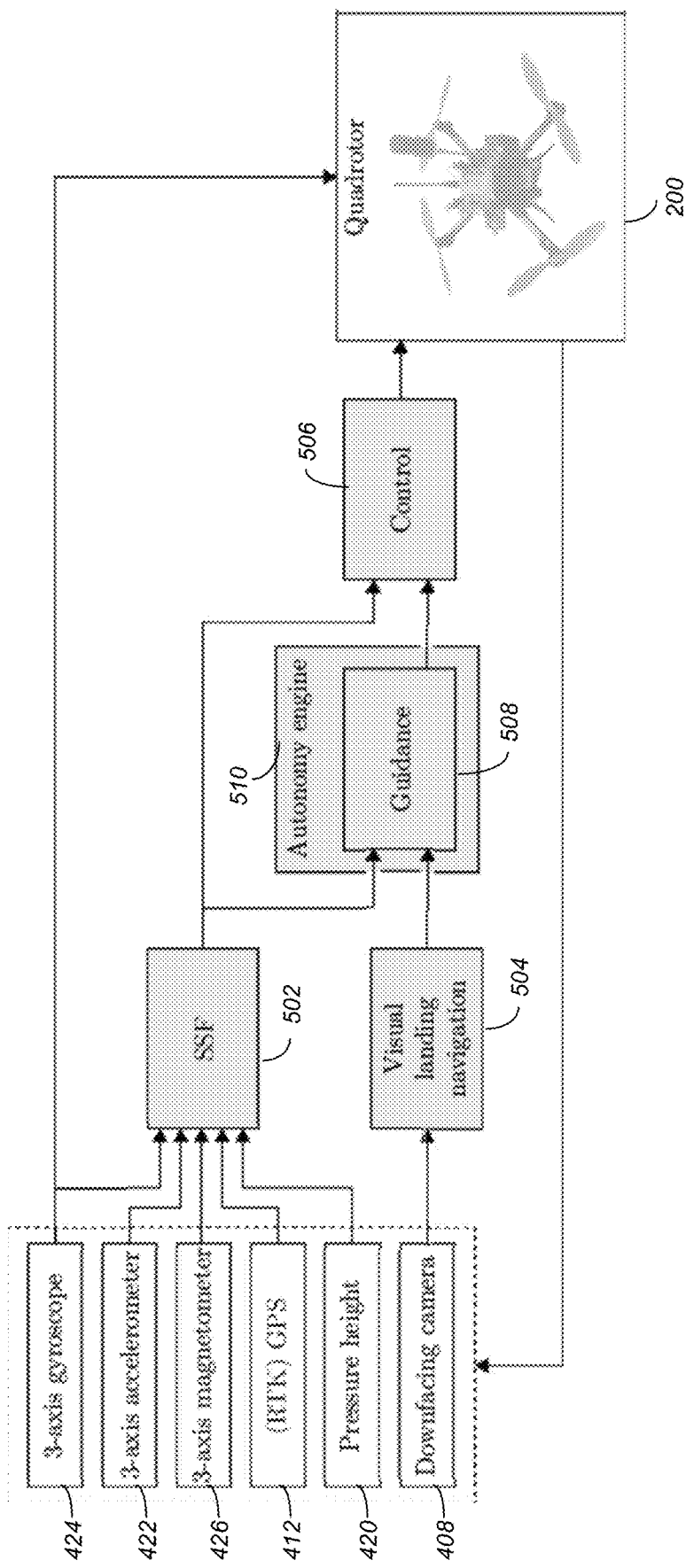
FIG. 5 illustrates the full autonomy system as an information flow diagram in accordance with one or more embodiments of the invention.

FIG. 5 illustrates the full autonomy system as an information flow diagram in accordance with one or more embodiments of the invention. The sensors 420-426, GPS 412, and downfacing camera 408 feed information to the single sensor fusion (SSF) state estimator 502 ([Weiss]), modified to handle multiple sensors, and to the visual landing navigation subsystems 504. SSF 502 and visual landing navigation subsystem 504 supply the control 506, guidance 508 and autonomy engine 510 algorithms with navigational information necessary for stabilization, trajectory generation, and state machine transitions. The control subsystem 506 is then responsible for trajectory tracking and desired motor speed computation of the quadrotor/vehicle 200.

Mission Architecture

The UAS executes a mission profile depicted in FIG. 2. Before each take-off 206, the system initializes the onboard state estimator and passes a series of preflight checks that include testing for an adequate battery voltage level and motor nominal performance. The vehicle 200 then performs a take-off maneuver by issuing a vertical velocity command to its low-level velocity controller to climb to an initial altitude. Once a safe altitude is reached, the mission execution module within the autonomy engine takes over. A mission is defined as a set of waypoints connected by individual trajectory segments that are calculated using polynomial trajectories following the approach of ([Mellinger]). A trajectory tracking module plays the mission trajectory forward in time by issuing position references to the low-level position controller. During mission execution 208, a system health observer monitors all critical components of the UAS and issues emergency messages to the autonomy engine 510 to implement fail-safe behaviors (e.g., return-to-home, emergency landing on low battery, or state estimation failure).

After the mission is completed, the UAS returns to the vicinity of the landing station 204 using the recorded GPS 210 position of the take-off location. A vision-based landing navigation algorithm 504 then detects the landing station 204 AprilTag fiducials (e.g., visual marker detection 214) with its downfacing camera 408. Once the landing location is accurately detected, a landing maneuver is executed by first hovering over the landing location and then issuing a trajectory with a fixed descent velocity that passes through the center of the charging pad surface (thereby providing for a precision landing 212). Touchdown is triggered by detecting zero velocity below a minimum altitude threshold.

Navigation

The navigation subsystem is responsible for estimating the UAS state and the landing pad pose in the world frame. The landing pad pose estimation is designed to provide a sufficiently accurate pose estimate to be able to land on a 90×90 cm surface. The vehicle pose estimator is designed to work in an outdoor environment such as a crop field (and/or an indoor environment).

Visual Landing Navigation

Figure 6:
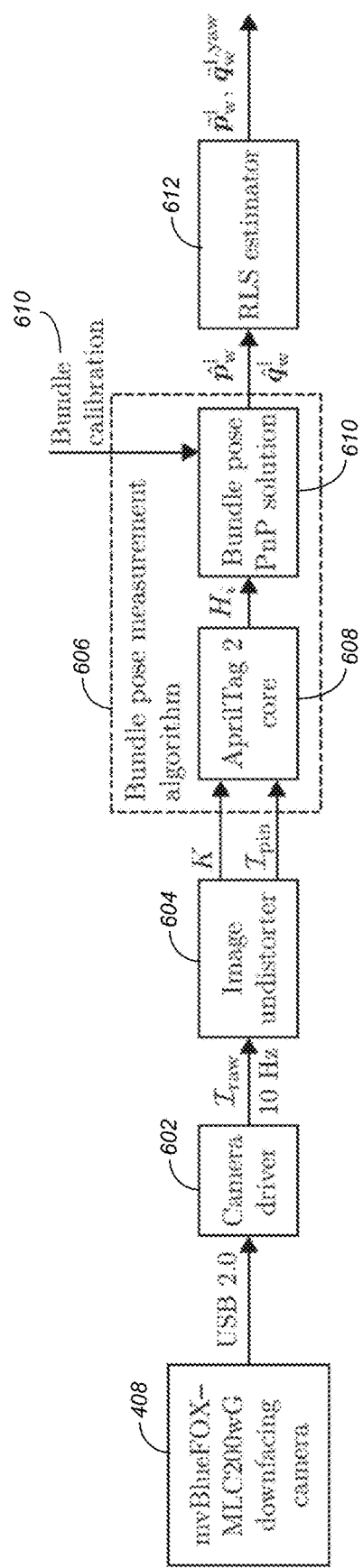
FIG. 6 details a landing site detection algorithm in accordance with one or more embodiments of the invention.

FIG. 6 details a landing site detection algorithm in accordance with one or more embodiments of the invention. The downfacing camera 408 (e.g., a Matrix Vision mvBlueFox MLC200WG camera) feeds a distorted 752×480 px grayscale image, $I_{raw}$, via a camera driver 602 into the image undistorter 604. The undistorter 604 removes radial distortion in the image via the ideal fish-eye lens model ([Devernay]), producing the undistorted image $I_{pin}$ assumed to be produced by a pinhole camera with calibration matrix $K \in \mathbb{R}^{3 \times 3}$. The unmodified AprilTag 2 implementation ([APRIL]) identifies AprilTag markers in $I_{pin}$ and for each tag with ID i produces a homography matrix $H_i \in \mathbb{R}^{3 \times 3}$. Assuming that at least one tag is detected, a bundle pose measurement algorithm 606 (e.g., a perspective-n-point solver ([OpenCV])) produces (e.g., via a core 608 and bundle pose PnP solution 610 based on a bundle calibration 610) an AprilTag bundle pose measurement $\hat{p}_w^l$, $\hat{q}_w^l$ of the landing pad in the world frame. This measurement is passed to a RLS estimator 612 to output $\tilde{p}_w^l$, $\tilde{p}_w^{l,yaw}$, where the latter is a pure yaw quaternion because the landing pad is assumed to be level. The RLS outputs are then used for landing navigation. The algorithm is executed on a single core of software component 400B (e.g., an Odroid XU4), except for the AprilTag 2 detector which runs on two cores, and achieves a measurement frequency of approximately 7 Hz.

Estimation of the landing pad pose using a tag bundle has several advantages. First, by providing more points to compute the homography matrix, the landing pad pose measurement becomes more accurate and robust to effects like tag corner detection error. Furthermore, a bundle can be composed of larger and smaller tags such that it is visible from a wide range of altitudes (see below).

Bundle Calibration 610

Figure 7:
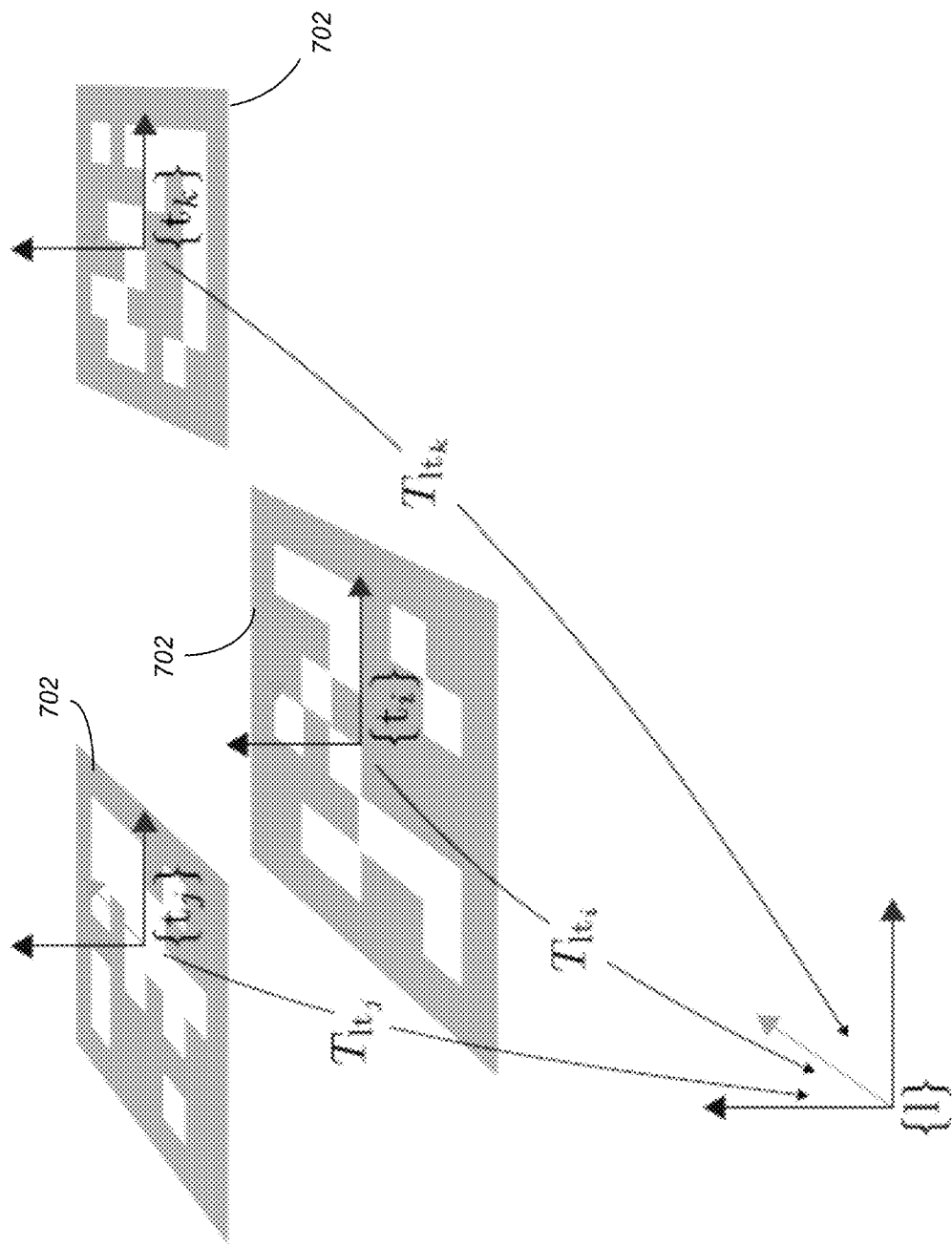
FIG. 7 illustrates exemplary rigid body transforms from each tag's local frame to the landing pad frame in accordance with one or more embodiments of the invention.

To compute $\hat{p}_w^l$, $\hat{q}_w^l$, the transformation matrix from each tag to the landing pad frame must be known. This is shown in FIG. 7 and the computation of these transforms is called landing bundle calibration 610. Because the landing pad pose directly affects the desired UAS landing pose, calibration is crucial for successful system operation. FIG. 7 illustrates exemplary rigid body transforms from each tag's local frame to the landing pad frame in accordance with one or more embodiments of the invention.

Figure 8:
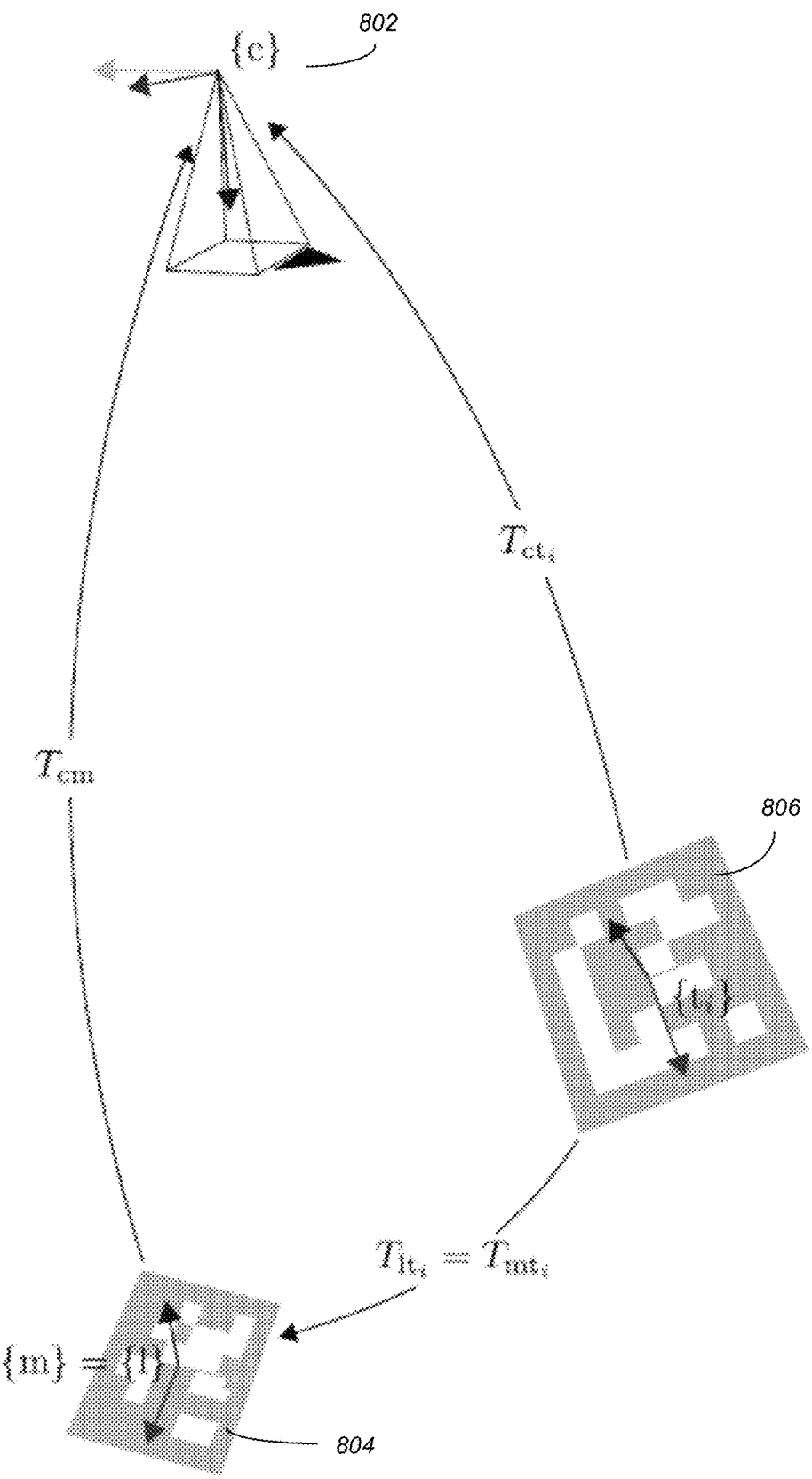
FIG. 8 illustrates the rigid transform triad formed during the calibration process between the camera frame, the master tag/landing pad frame, and the ith tag frame in accordance with one or more embodiments of the invention.

An exemplary calibration approach is to place the UAS downfacing camera 408 with the landing bundle 702 visible, forming a rigid body transform triad as shown in FIG. 8. Specifically, FIG. 8 illustrates the rigid transform triad formed during the calibration process between the camera frame 802, the master tag/landing pad frame 804, and the ith tag frame 806. For the calibration process, a "master" AprilTag marker 804 is placed at the position and yaw desired for the world frame origin on the landing station (landing pad frame) that the UAS and the downfacing camera 408 respectively use during landing. The unknown calibration transform $T_{lt_i}$ is given by:

$$T_{lt_i} = T_{cm}^{-1} T_{ct_i}.$$

However, every standalone tag pose measurement contains error due to effects from image blur, pixel quantization, and so forth. The result of single-measurement computation (1) is therefore not reliable. For this reason, a statistical approach is taken and a sequence of several hundred $\hat{T}_{ct_i}$ and $\hat{T}_{cm}$ is collected. These measurements are then combined into a geometric median position and a mean quaternion attitude of each tag relative to the landing pad frame. Computational details are provided in ([Malyuta]).

Landing Alignment

Figure 9:
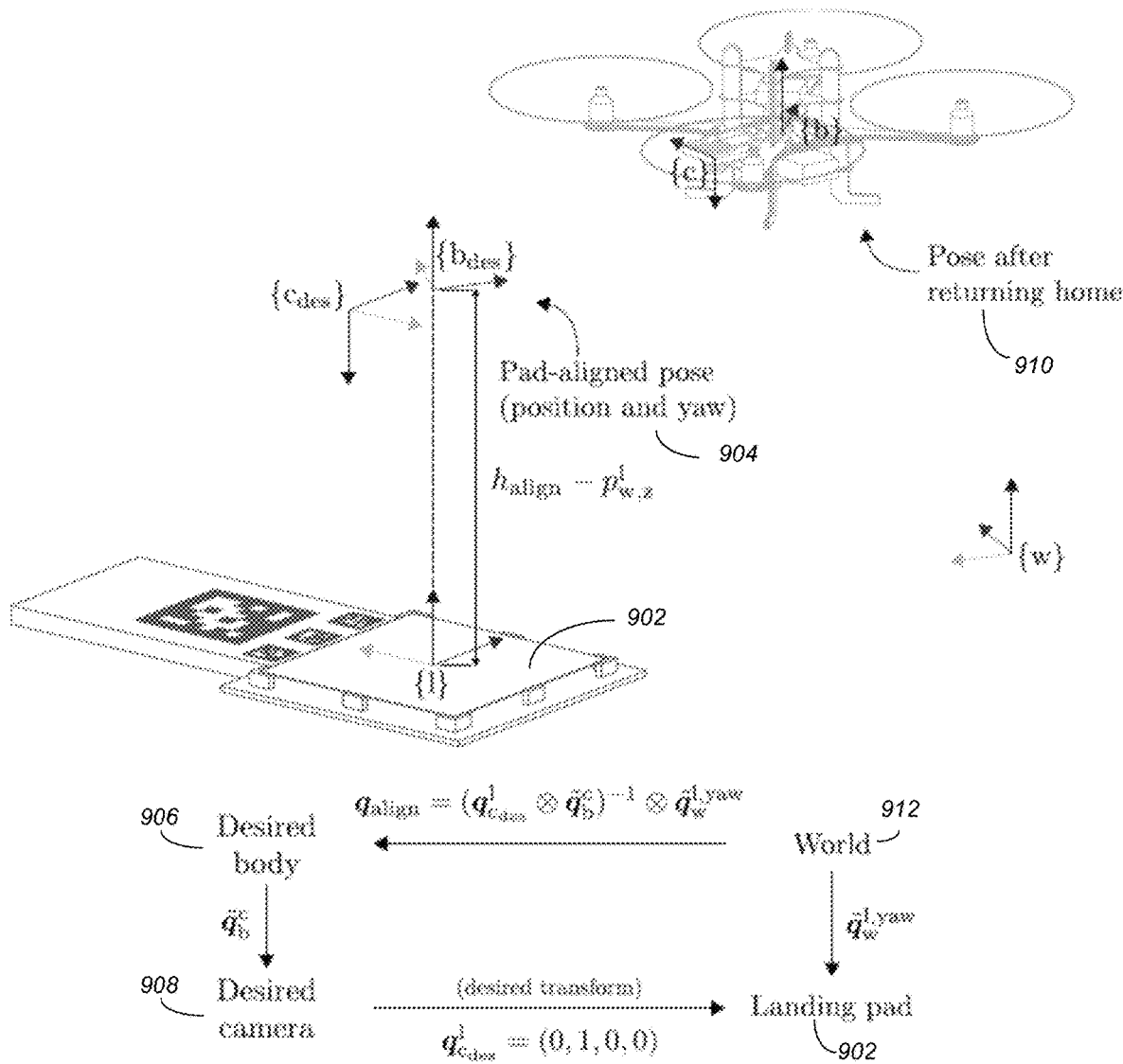
FIG. 9 illustrates an exemplary frame setup for pad-aligned body frame pose computation during the initial part of the landing phase in accordance with one or more embodiments of the invention.

After returning from a mission the UAS flies to the last recorded GPS position at a save altitude above the landing station (home position, 910) to start the precision landing process. The UAS can align itself with the landing pad by using landing pad pose estimate $\tilde{p}_w^l$ and $\tilde{q}_w^{l,yaw}$. For this purpose, consider the alignment scenario depicted in FIG. 9. In this regard, FIG. 9 illustrates an exemplary frame setup for pad-aligned body frame pose computation during the initial part of the landing phase in accordance with one or more embodiments of the invention. The desired attitude of the camera 408 is to look straight down at the landing pad frame 902, hence $q_{c_{des}}^l$ corresponds to a 180° rotation about the x-axis (resulting in a pad-aligned pose 904). As shown in FIG. 9, the system has all of the elements necessary to compute the desired body pose 906 such that the UAS is center-aligned with the landing frame 902 and the camera 908 is facing down with a yaw implicitly defined by the master tag during the bundle calibration step described above:

$$q_{align} = (q_{c_{des}}^l \otimes \bar{q}_b^c)^{-1} \otimes \bar{q}_w^{l,yaw},$$

$$p_{align} = \bar{p}_w^l + (h_{align} - \bar{p}_{w,z}^l)e_z,$$

where $h_{align}$ is the desired altitude above the landing pad before final descent and $e_z = (0, 0, 1)$. In other words, the system computes and aligns the vehicle in the pad-aligned pose 904 with the desired position and yaw. Once aligned, the landing autopilot descends the UAS until touchdown.

Vehicle Pose Estimation

The state estimation subsystem computes the vehicle pose to be used for guidance and control. For this purpose the SSF algorithm ([Weiss]) is extended to fuse multiple sensors. In particular, embodiments of the invention may use an inertial measurement unit (IMU) 422 and 424, a global positioning system (GPS) sensor 412-416 for position and velocity, a pressure sensor 420 for improved height estimation, and a three-axis magnetometer 426 for yaw observability during hover and constant velocity flight. One may denote by {b,} {g,} {m}, and {p} the body (i.e., IMU), GPS, magnetometer, and pressure sensor frames, respectively, and use the following state vector:

$$x_{state} = (p_w^b, v_w^b, q_w^b, b_w, b_a p_b^g, q_b^m m_w, b_p, p_b^p),$$

where $q_w^b$ is the core state, $b_w \in \mathbb{R}^3$, $b_a \in \mathbb{R}^3$, and $b_p \in \mathbb{R}$ are the gyroscope, accelerometer, and pressure sensor biases and $m_w \in \mathbb{R}^3$ is a normalized magnetic field vector. The core state portion of the state vector together with the raw gyroscope body rate measurement is used for control and guidance. During the landing phase, the landing pad pose estimate $\tilde{p}_w^l$ and $\tilde{q}_w^{l,yaw}$ is used to relocalize the landing pad in the world frame 912. This is necessary due to drift in the GPS sensor during long flights.

Guidance

The guidance subsystem 508 is responsible for generating control 506 reference signals with the aim of following a specific trajectory or arriving at a specific destination ([Grewal]). This section describes the guidance philosophy and main aspects, while further computational details may be utilized from ([Malyuta]).

The guidance subsystem is designed with the objectives of being computationally lightweight and capable of generating predictable trajectories that are dynamically feasible and that enable the UAS to explore an obstacle-free 3D volume via point-to-point constant velocity segments. Among existing methods that minimize snap ([Burri], [de Almeida], [Mellinger]; [Richter]), jerk ([Mueller 2013], [Mueller 2015]), and energy([Açıkmeşe]; [Blackmore]), embodiments of the invention to compute the trajectories as fully constrained ninth-order polynomials that are smoothed up to snap at their endpoints. This avoids online optimization and makes the planned trajectory much more readily predictable than the other approaches.

Trajectory Segments

A mission is comprised of a sequence of trajectory segments. Two primary types of trajectories may be utilized. The first, a transfer trajectory, interpolates all derivatives up to snap smoothly between any two values in a fixed amount of time. The second, a mission trajectory, is a set of constant velocity segments between user-defined waypoints where transitions between different velocities are filleted by transfer trajectories. Embodiments of the invention also provide the ability to hover at any waypoint in the mission trajectory, (e.g., which may occur at the first and second to last waypoints). In various circumstances, the trajectory may consist mostly of constant velocity segments. Embodiments of the invention ensures that these segments between user-defined waypoints are straight, which is desirable for most remote-sensing applications.

Trajectory Sequencer

The trajectory sequencer aggregates individual trajectory segments into a continuous sequence of trajectories. This may be implemented as a doubly-linked list where each element stores the trajectory segment, a timestamp and a type which is either single or cyclic where in the former case the trajectory is flown only once and in the latter it is repeated until being aborted by other means such as a low battery charge flag. Embodiments of the invention may additionally provide a volatile element which enables executing one-time transfer trajectories to correct for very large trajectory tracking errors.

Control 506

Embodiments of the invention may utilize a three-stage cascaded control architecture to track the reference trajectories output by the trajectory sequencer. The stages are, from an outer- to an inner-most loop: translation, attitude, and body rate controllers. A cascaded controller has the advantage that inner loops provide faster disturbance rejection and reduce the effect of nonlinearities ([Skogestad]), which is beneficial for accurate tracking. The controller 506 may be executed on the AscTec HLP 400A as illustrated in FIG. 4.

The guidance subsystem forms the outermost loop. It is executed at 20 Hz and outputs a reference position $p_{ref}$, a reference velocity $v_{ref}$, a reference yaw $\psi_{ref}$, and optionally a feed-forward acceleration car and feed-forward body rates off. All quantities are obtainable from polynomial trajectories via differential flatness theory ([Mellinger]).

Translation control forms the next inner loop and consists of a prefiltered two-degree-of-freedom PID controller ([Skogestad]) which outputs a desired vehicle acceleration $a_{ref}$. Since $a_{ref}$ defines a reference thrust vector, the translation controller may be thought of as a thrust vector calculator. To prevent excessive tilt of the UAS, embodiments of the invention limit the thrust vector to a 20° cone half-angle about the vertical axis. Translation control loop bandwidth is between 1 and 2 rad/s. In the event of a loss of state estimation due to communication or sensor failure, a standby emergency landing controller can override the translation controller and land the UAS by inducing a −2 m/s vertical velocity in an open-loop fashion similar to [Lupashin] and [Mueller 2012]. This event can occur as a result of serial communication cable failure, for example.

The attitude control forms the next inner loop and tracks $a_{ref}$ and $\psi_{ref}$ by generating a body rate reference $\omega_{ref}$ and a collective thrust reference Tref for the body rate controller. Embodiments of the invention may implement an attitude controller based on the globally asymptotically stable and robust to measurement noise quaternion-based controllers introduced in ([Brescianini] and [Faessler 2015]). The attitude control loop bandwidth is between 5 and 10 rad/s.

The body rate controller forms the inner-most loop of the cascaded flight control system. It tracks $\omega_{ref}$ by computing reference body torques, following the feedback-linearizing control scheme presented in ([Faessler 2017]). These along with Tref are then converted into individual reference motor thrusts fref that are mapped to propeller speeds via a full quadratic motor calibration map. A controller may use a thrust saturation scheme based on ([Faessler 2017]) which prioritizes roll and pitch torques, which are the most important ones for stability. The body rate control loop bandwidth is approximately 40 rad/s.

Autonomy Engine 510

The autonomy engine subsystem 510 implements the logic for long-duration fully autonomous operation with repeated data acquisition flights.

Architecture Overview

Figure 10:
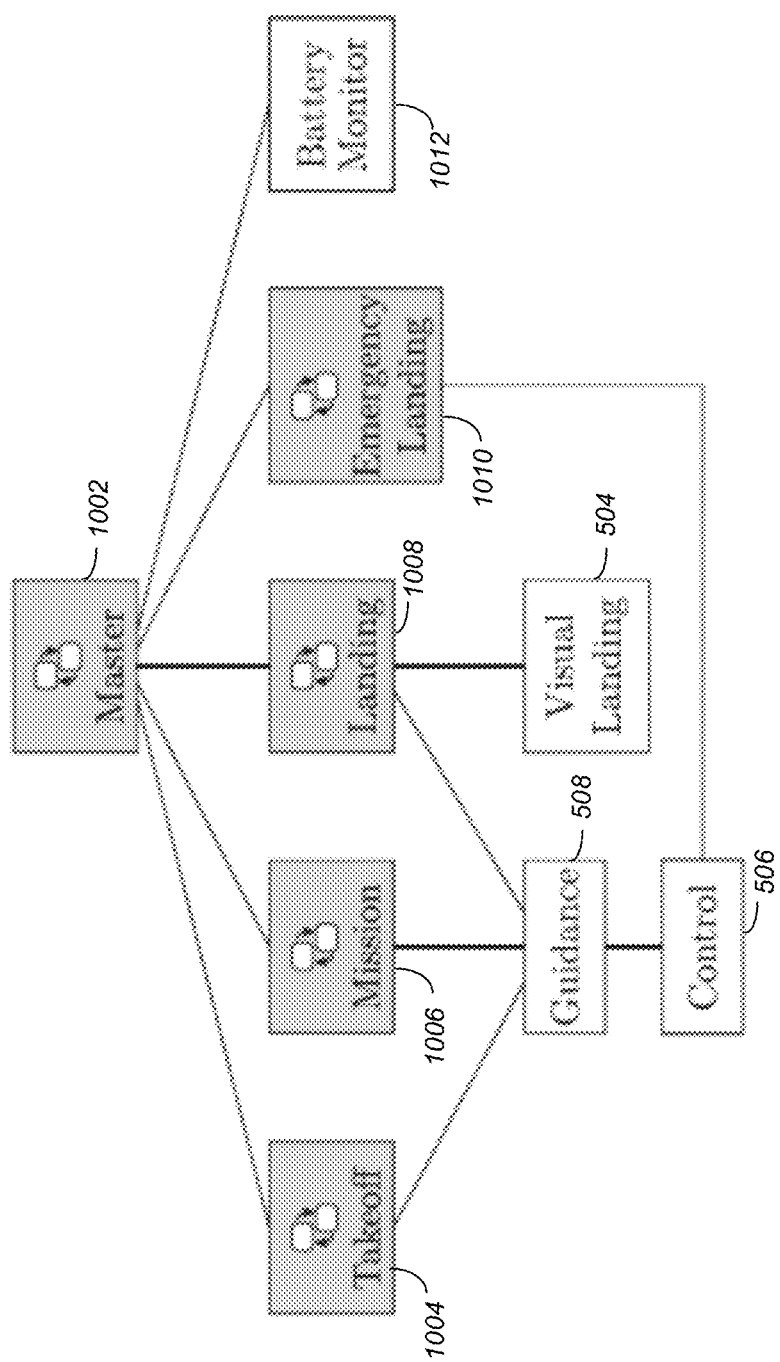
FIG. 10 illustrates a hierarchy of (master) state machines and autopilots and their interface to other major subsystems in accordance with one or more embodiments of the invention.

FIG. 2 illustrates the overall concept of operation for repeated data acquisition. Each mission 208 phase is implemented as a standalone state machine called an autopilot that executes the logic associated with the phase whenever it is activated via a robot operating system (ROS) action interface. To coordinate calls to each autopilot, an additional overarching logic is implemented as a high-level master state machine. The hierarchy of (master) state machines and autopilots (1002-1010) and their interface to other major subsystems is shown in FIG. 10. The autopilots 1002-1010 execute the logic associated with the corresponding mission phase and their execution is synchronized by the master 1002 to perform a specific mission profile. All state machines are executed in parallel threads at a frequency of 20 Hz. A description of each of the different autopilots 1002-1010 follows.

Master State Machine 1002

Figure 11:
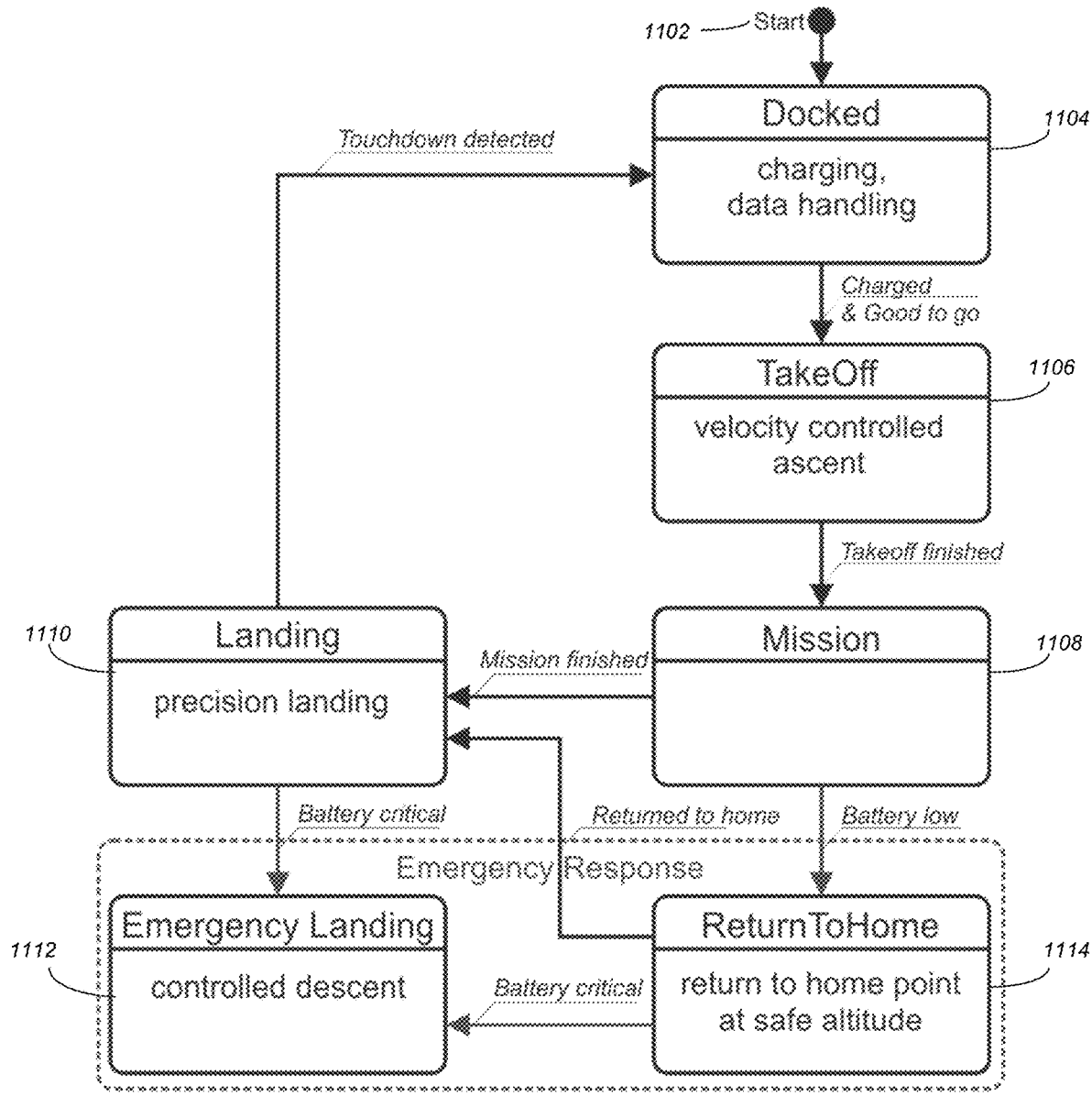
FIG. 11 illustrates a master state machine diagram for a master state machine that parses mission events (e.g., battery status and touchdown direction) and coordinates calls to the phase-specific autopilots, but performs no computations itself in accordance with one or more embodiments of the invention.

The master state machine 1002 coordinates calls to the phase-specific autopilots and is illustrated in FIG. 11. Specifically, FIG. 11 illustrates a master state machine diagram for a master state machine that parses mission events (e.g., battery status and touchdown direction) and coordinates calls to the phase-specific autopilots, but performs no computations itself.

Thus, in contrast to the computation-heavy autopilots, the master 1002 performs no computations itself. Its sole responsibility is to initiate event-based state transitions. In the take-off 1106, mission 1108, landing 1110, and emergency landing 1112 states the master state machine 1002 activates the appropriate autopilot and waits for it to complete. If necessary, the master 1002 can also abort 1114 each autopilot to execute robust behaviors for cases like low battery charge in flight or abnormal motor performance before take-off. For example, if battery charge anomalously drops to critical levels, the mission 1108 and landing actions 1110 can be aborted mid-execution to perform an emergency landing action 1112.

In view of the above, as illustrated in FIG. 11, the state machine starts at 1102 with a state of the vehicle being docked with charging and data handling taking place. Once charged and safety checks are passed (i.e., the vehicle is good to go), the state machine transition to a takeoff state 1106 with a velocity controlled ascent. Once takeoff has finished (e.g., the vehicle has reached a desired altitude), the state machine may transition to the mission state 1108. During the mission state 1108, data is collected. Once the mission is finished, the machine transitions to landing state 1110 for a precision landing. Further, if the battery is low (critically or otherwise), the state machine may abort the other states to invoke an emergency response by transitioning to the return to home state 1114 during which the vehicle returns to the previous takeoff location at a safe altitude, and/or if a battery critical indicator is triggered, the machine may transition to emergency landing state 1112 with an in-place controlled descent (e.g., if the return to the prior take-off location cannot be completed due to critical battery or other condition).

Take-Off Autopilot 1004

Figure 12:
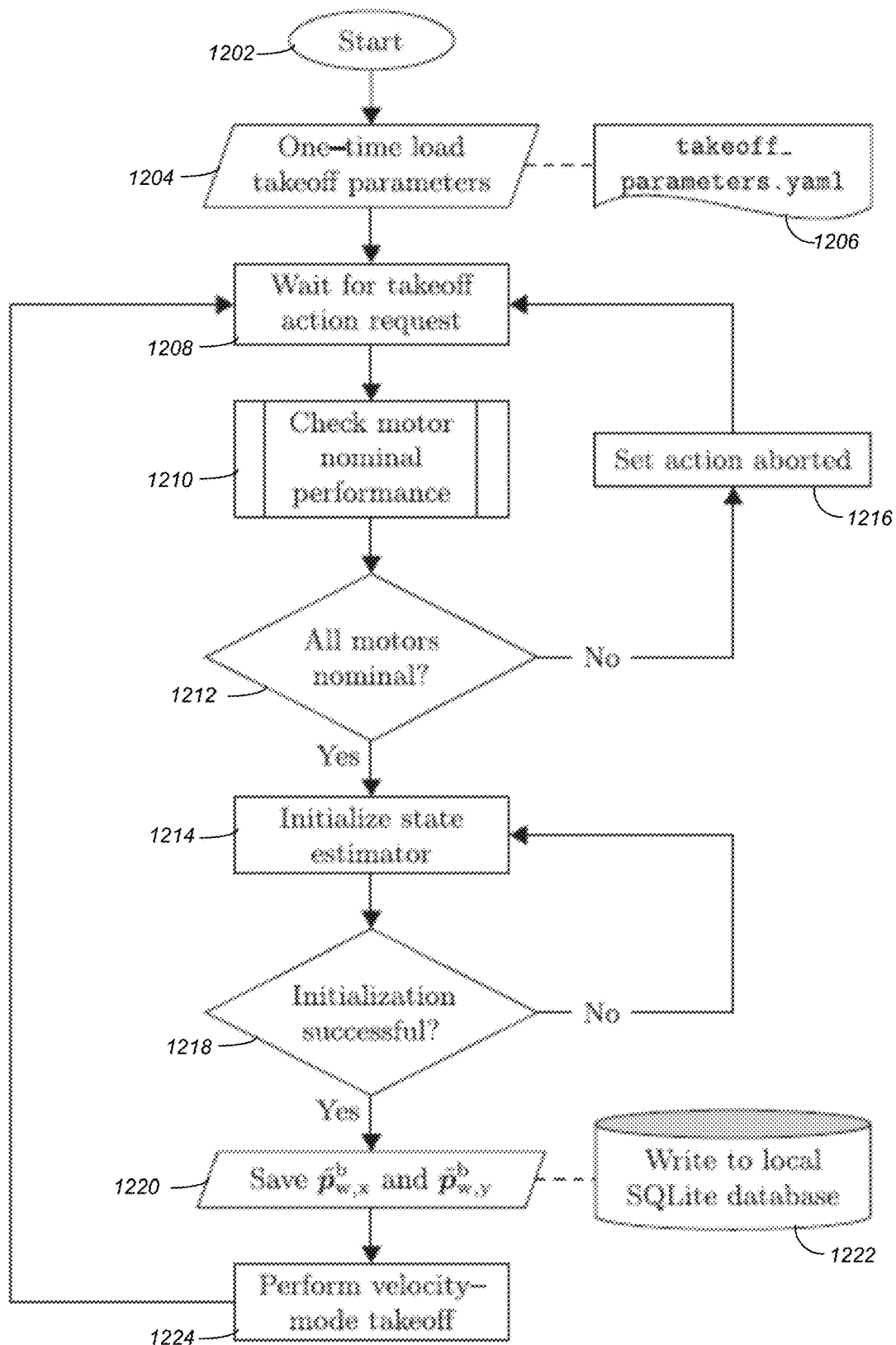
FIG. 12 illustrates the logic for the take-off autopilot in accordance with one or more embodiments of the invention.

The take-off autopilot 1004 takes the UAS from a motors-off state on the charging pad to a hover at a target take-off altitude. The procedure for the take-off autopilot is illustrated in FIG. 12. The process starts at step 1202 and at step 1204 one-time load takeoff parameters 1206 are loaded. The process then waits for a takeoff action request at step 1208.

A check for motor nominal performance is conducted at step 1210 and a determination is made regarding whether all motors are nominal at step 1212. After successfully validating motor nominal performance, the state estimator is reinitialized at step 1214. If the initialization is successful (e.g., after a prolonged charging phase), the current horizontal location is stored in permanent memory (e.g., written to a local SQLite database 1222) at 1220, and the take-off autopilot commands a velocity-controlled take-off at step 1224 that takes it from the initial position on the charging pad to a hover at a target altitude.

Two parts of the take-off procedure are of particular interest. The first is the motor nominal performance check 1210 which occurs before take-off. Motors are spun at a low RPM, which is measured via zero crossing detection, and are verified to rotate within 400 RPM of the nominal value. Ten attempts to pass this check (at step 1212) are allowed before the take-off is aborted at step 1216. Test flights have provided instances of this procedure saving the UAS, for example, when an I2C cable to one of the motors dislodged. The next important part of the take-off is saving 1220 the current location to a database 1222 in permanent memory. This gives the UAS knowledge of where to return to after the mission and also prevents this information from being lost in case a software reset is required.

Mission Autopilot 1006

Figure 13:
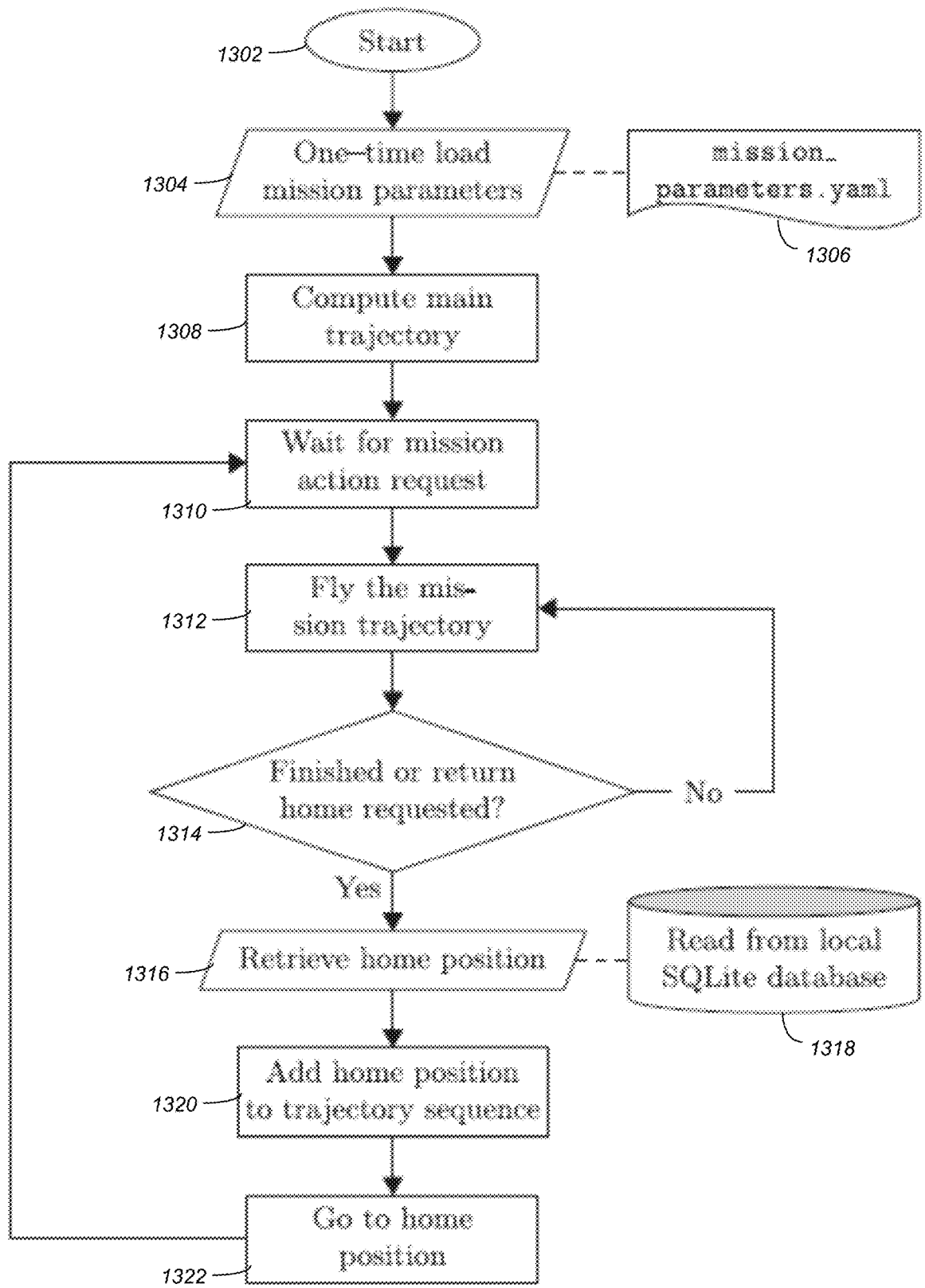
FIG. 13 illustrates the flow for the actual data acquisition mission by interfacing with the guidance subsystem described above in accordance with one or more embodiments of the invention.

The mission autopilot 1006 is responsible for executing the actual data acquisition mission as defined by the user in the form of individual waypoints and hover times. The algorithm is illustrated in FIG. 13. Specifically, FIG. 13 illustrates the flow for the actual data acquisition mission by interfacing with the guidance subsystem described above in accordance with one or more embodiments of the invention. The mission trajectory is performed either once or is reflown continuously until an event such as low battery charge requests the UAS to return to the charging pad.

The process starts at step 1302. At step 1304, the one-time load of mission parameters 1306 occurs. At step 1307, the main trajectory is computed and the autopilot 1006 waits for a mission action request at step 1310. The mission trajectory is flown at step 1312 until the mission is completed (as determined at step 1314). Once the autopilot 1006 determines at step 1314 that the mission is finished or a return to home is requested, the autopilot 1006, at step 1316, retrieves the home position by reading the position from a local SQLite database 1318. At step 1320, the home position is added to a trajectory sequence and the vehicle flies/goes to the home position at step 1322 after which it again waits for a mission action request at step 1310.

Landing Autopilot 1008

Figure 14:
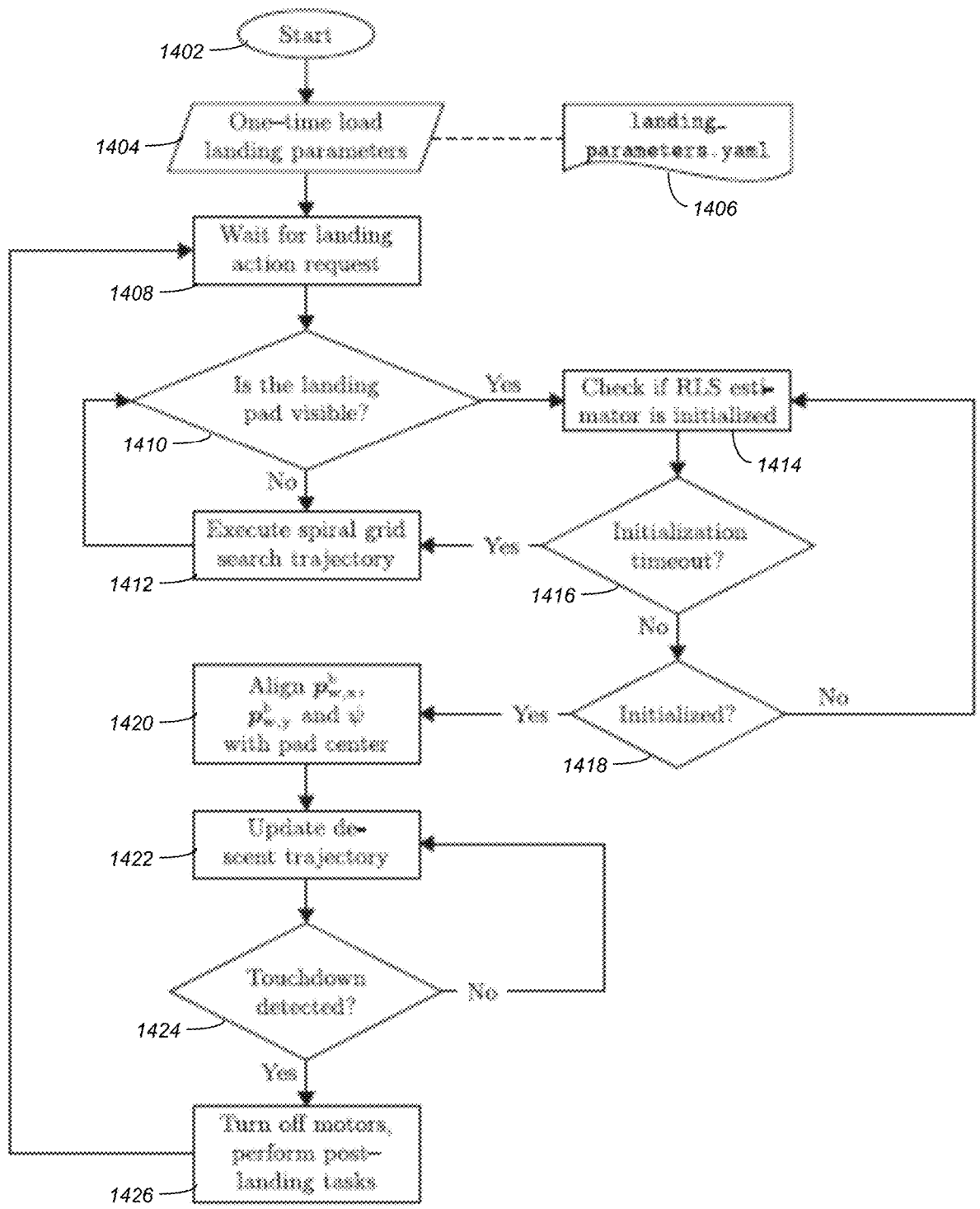
FIG. 14 illustrates the landing procedure in accordance with one or more embodiments of the invention.

The landing autopilot 1008 safely takes the UAS from a hovering state in the vicinity of the landing pad to a motors-off state on the charging surface. The landing procedure is illustrated in FIG. 14. The process starts at step 1402, and at step 1404, the landing parameters 1406 are loaded. At step 1408, the autopilot 1008 waits for a landing action request.

At step 1410, a check is performed to determine if the landing pad is visible in the downfacing navigation camera image, that is, if any AprilTag in the bundle is detected. If not, at step 1412, the UAS executes the spiral grid search trajectory until the landing bundle becomes visible. The vision-based landing navigation algorithm (FIG. 6) then becomes activated via step 1414 (to determine if the RLS estimator is initialized during the last step 612 of FIG. 6), step 1416 (e.g., via an initialization time-out determination), and step 1418 (a determination regarding whether it has been initialized). Once the RLS estimator is initialized as determined by step 1418), the estimated yaw is used to align the vehicle attitude such that the camera points towards the visual markers, while the landing position estimate is used to align the vehicle's lateral position over the center of the charging pad at step 1420. The vehicle then uses and updates a descent trajectory at step 1422, and performs a constant velocity descent until touchdown is detected (at step 1424) based on 0.3 m height and 0.1 m/s velocity thresholds:

$$\text{touchdown} = (\hat{p}_{w,z}^b - \hat{p}_{w,z}^l) < 0.3 \char`\^ |\hat{v}_{w,z}^b| < 0.1.$$

After touchdown, the motors are turned off and post-landing tasks are performed at step 1426.

Emergency Lander 1010

Figure 15:
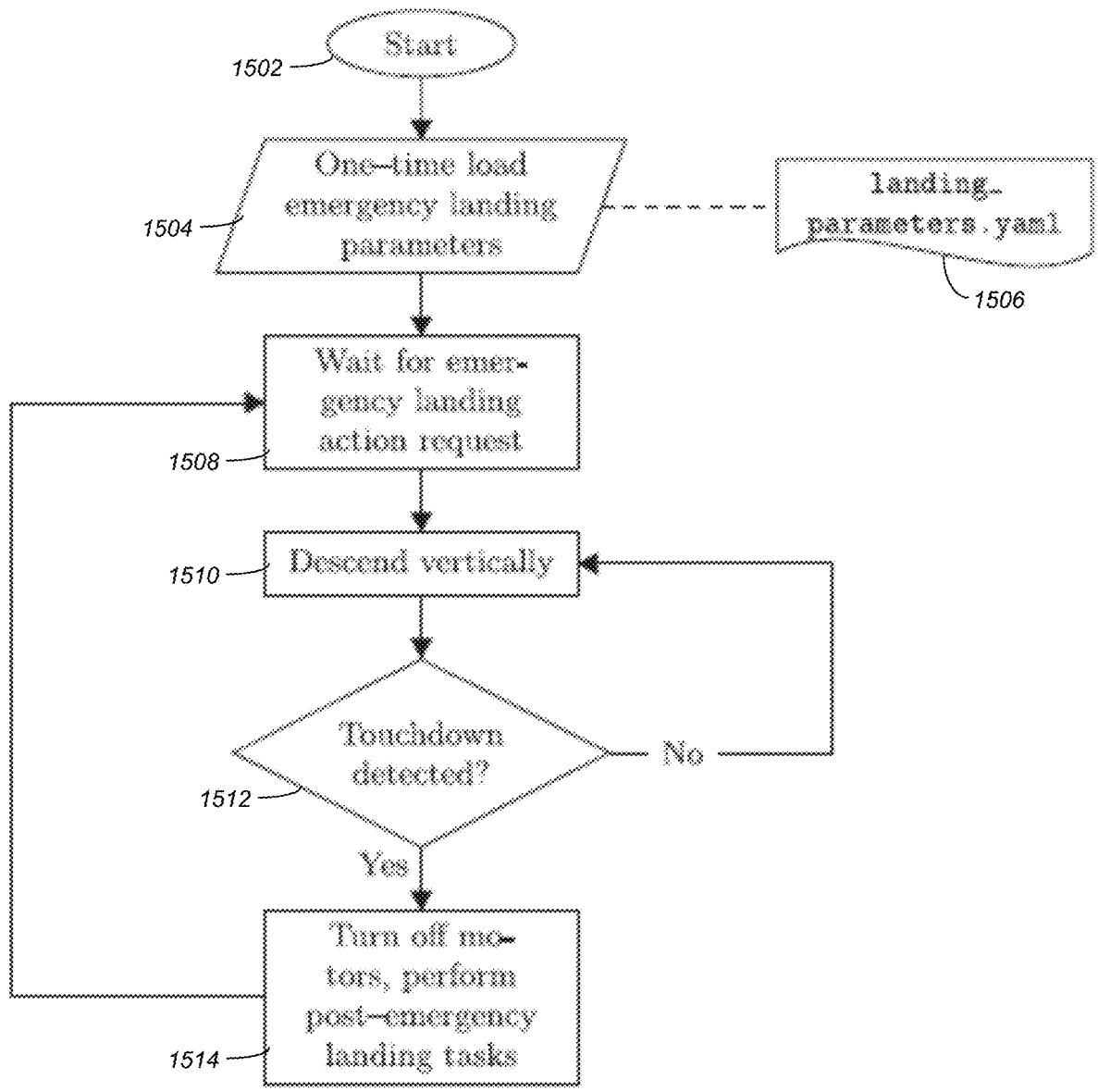
FIG. 15 illustrates the emergency lander logic in accordance with one or more embodiments of the invention.

The emergency lander 1010 brings the UAS to a soft touchdown at its current location and is triggered in response to a critically low battery voltage event. The emergency lander logic is illustrated in FIG. 15. The process beings at step 1502 and at step 1504 one-time loads the emergency landing parameters 1506. At step 1508, the emergency lander 1010 waits for an emergency landing action request. At step 1510, the algorithm descends the UAS with a mild vertical velocity of 0.3 m/s until touchdown is detected at step 1512 based on a 0.1 m/s velocity threshold:

$$\text{touchdown} = \|\tilde{v}_w^b\|_2 < 0.1.$$

At step 1514, the motor is turned off and post-emergency landing tasks are performed.

Overall Flow

In view of the above, embodiments of the invention provide a method and system for autonomously operating an unmanned aerial system (UAS) over long periods of time to execute long-duration fully autonomous missions including autonomous energy replenishment. As used herein, the term autonomous means governing itself or having control of its own affairs (i.e., without outside control) (i.e., without any human intervention). The UAS may include onboard navigation sensors and software for executing onboard autonomy.

The UAS autonomously takes off from a take-off landing-charging station to a safe altitude. The take-off action may further include validating nominal performance of the UAS prior to take-off and storing a current location of the UAS on the take-off landing-charging station in a database in permanent memory (where the current location provides knowledge of where to return after the mission).

After take-off, the UAS autonomously executes a mission that consists of a set of waypoints and hover times (and can also include data acquisition instructions).

Exemplary missions may include ecosystem monitoring with on-board sensors, precision agriculture, surveillance/monitoring applications, and/or long distance (package) delivery.

After mission execution, the UAS autonomously travels/flies to a target landing-charging station. In one or more embodiments, the target landing-charging station is the (same) take-off landing-charging station (i.e., the same station that was used for take-off). In an alternative embodiments, the target landing-charging station is a different landing-charging station to that of the take-off landing-charging station. In one or more embodiments, the landing-charging stations consist of a physical station that is a weather shelter and weather monitoring sensors for delaying flight operations in adverse conditions. Further, the UAS vehicle may perform precision landing inside such a weather shelter using GPS-denied navigation methods.

The UAS then performs an autonomous precision landing on the target landing-charging station. Precision as used herein refers to within a threshold area such that recharging on the landing-charging station can be performed. The precision landing is based on: a vehicle pose estimation which in turn may be based on the detection of visual fiducials (e.g., with an on-board camera); the detection of multiple (e.g., three (3)) beacons (e.g., ultra-side band transmitters) that are located next to/adjacent/within a threshold distance of the target landing-charging station; or other homing sensors. In embodiments of the invention, the UAS may also include disturbance aware motion control for landing to account for disturbances such as wind, ground effect, performance degradation of motors/rotors/other critical flight components, or other disturbances. Further details for the disturbance aware motion control may be found in the provisional application cited above. In this regard, embodiments of the invention provide for an autonomous precision landing that is based on a control method that rejects disturbances.

Once landed, the UAs autonomously recharges via the target landing-charging station. Once re-charged (i.e., after energy replenishment), the UAS is ready to execute a next sortie of the mission. The re-charging may be performed via contact based on the recharging of a batter, wireless recharging of a battery, a battery exchange, and/or re-fueling.

In addition, when landed, the UAS autonomously transmits mission data. Such mission data may be to/for data storage and to/for data processing on a landing station computer (e.g., an adjustment plan for the next mission/sortie, based on previously collected data). The mission data may also be uploaded to the cloud for cloud based processing (e.g., to provide real-time data products to a user, and/or to have quick turn-around data for an adjustment to the plan for the next mission/sortie). Further to the above, a web-based user interface may be utilized to allow a user to monitor the UAS/system (e.g., function and data products).

Based on the above, the landing-charging stations (e.g., the take-off and/or target) may include/consist of a physical station with hardware for energy replenishment and localization aids for the precision landing, and energy storage to replenish energy to the UAS. Such energy storage and replenishment means may include a generator, battery, connection to electrical power grid, connection to a reusable energy source (e.g., a local solar/wind energy source), or similar. The stations may also include weather monitoring to issue flight/no flight decisions (e.g., high winds/precipitation). The landing-charging stations may also include a ground station computer for data transfer and/or autonomous mission planning based on previously observed data. In addition, the landing-charging station may be connected to the web/cloud via cell phone link or other connection.

The above steps may enable repeated mission/sortie execution without any human intervention.

Further, an autonomy system of the UAS/vehicle may include system health monitoring (for monitoring in-flight emergencies and/or to report system status to a user), and to enable emergency behaviors. Such emergency behaviors may include a return to home (e.g., the take-off landing-charging station) and land maneuver when stored energy is not sufficient for completion of a mission/sortie, and/or an emergency landing in case of battery depletion (e.g., critical battery charge remaining) or hardware failure. In this regard, the autonomy system may determine that an in-flight emergency has occurred and either return to the (take-off and/or target) landing-charging station or perform an emergency landing dependent upon conditions of the in-flight emergency.

Experimental Results

The system was tested in four configurations of increasing complexity. These were software-in-the-loop (SITL) simulation ([Furrer]), indoor tethered flights with VICON-based (motion capture system) state estimation, outdoor tethered flights with GPS-based state estimation and outdoor free flights. SITL simulation allows for rapid testing and debugging by removing most logistic concerns and by making it easier to identify algorithmic errors due to the absence of real-world noise. Indoor test flights under VICON allow one to refine the guidance, control and autonomy subsystems independently of state estimation. Finally, outdoor flights validate that the system works in its real-world environment.

Vision-Based Landing Accuracy

To design an AprilTag marker bundle for localizing the landing pad as explained above, embodiments of the invention first analyzed the detection accuracy in a stationary setting of the AprilTag 2 algorithm for single tags at various observation distances using the downfacing camera, i.e., deployed on an UAS.

Standard deviations were determined for the distance estimate for various tag sizes and distances. It was found that for a given tag size, the estimation accuracy decreases with increasing distance. Large tag sizes (48 and 60 cm) are not detected at distances below 2 m, while small tag sizes (10, 15, and 20 cm) cease to be detected above 4 m. For an initial approach height of 4 m, a 48 cm tag was selected for an expected $2\sigma$ (i.e., 2 SD) height estimation error of 4.5 cm and it was bundled with three 15 cm tags for increased precision at lower altitudes, resulting in the bundle depicted in FIG. 3 and the bottom left of FIG. 16 (i.e., bundle 1602).

Additional experiments conducted include a quadrotor flown at various heights above the landing marker bundle shown in FIG. 3. The statistics for the error between the height estimate using the AprilTag detector and the ground truth from RTK-GPS were plotted. At the approach height of 4 m, the $2\sigma$ height detection error was found to be 0.32 m. The error decreased to below 0.1 m in the final stage of the descent. One may note that this estimation error variance is larger than for individual tags. The increased error is most likely caused by image blur and latency effects due to the motion of the vehicle and a lever arm effect that amplifies position errors at the desired landing location (the charging pad center) as a result of angular errors in the AprilTag detection. The optimization discussed below provides a remedy to the lever arm effect.

Additional testing evaluated the accuracy of autonomous landing in three environments of increasing complexity. First, 200 landings were tested in SITL simulation with a random wind force averaging 30 km/hr modeled as a random walk for the wind direction. The $2\sigma$ landing error was found to be 0.09 m (major half-axis) and 0.08 m (minor half-axis). Because simulation uses the ground-truth UAS pose for control, one may conclude that this is roughly the landing error that control and landing navigation algorithms are able to maintain in severe wind conditions. Next, the UAS performed 27 landings indoors with VICON state estimation in near-optimal conditions. The resulting $2\sigma$ landing error ellipse aggregates all detection and control errors. The lateral $2\sigma$ error is 0.11 m (major half-axis) and the longitudinal $2\sigma$ error is 0.08 m (minor half-axis). Such testing enabled a conclusion that the accuracy was similar to simulation, which indicates that real-world uncertainty sources like model inaccuracy and data signal latency degrade landing precision by a similar amount as severe wind conditions with an otherwise ideal system.

Finally, 21 landings were performed out-doors using RTK-GPS for ground truth. The lateral $2\sigma$ error is 0.37 m (major half-axis) and the longitudinal $2\sigma$ error is 0.28 m (minor half-axis). While this is well within the charging surface dimensions, the increased landing error is representative of the less accurate outdoor vehicle pose estimate, camera exposure adjustment effects due to light conditions, more complex aerodynamic effects from wind than those modeled in simulation, and so forth. Because embodiments required the downfacing camera to collect more pad pose measurements to initialize the RLS filter, the outdoor landing trajectories demonstrated a visible hover period at the preset 4 m approach altitude.

Optimizing the AprilTag Bundle Layout

A simulated set of experiments were carried out in Gazebo ([Koenig]) to search for an AprilTag bundle geometry which minimizes the landing pad position measurement error. While many factors affect the AprilTag position measurement error, such as the camera-tag off-axis angle ([Olson]; [Wang]), an investigation conducted in embodiments of the invention considered only the camera-tag distance while keeping the off-axis angle zero. This choice is appropriate for various use cases, since the dominant variable that changes during the landing phase is the quadrotor height and the camera is facing approximately straight down at the AprilTag bundle. Furthermore, the simulation environment allows one to isolate the effect of bundle geometry since other variables (e.g., illumination, lens focus, etc.) are easily controlled for. Thus, bundle geometry and camera-tag distance are the only independent variables. Accordingly, a simulation of embodiments of the invention uses the downfacing camera parameters described above, that is, a 752× 480 px resolution and the same calibration matrix $K \in \mathbb{R}^{3 \times 3}$.

Figure 16:
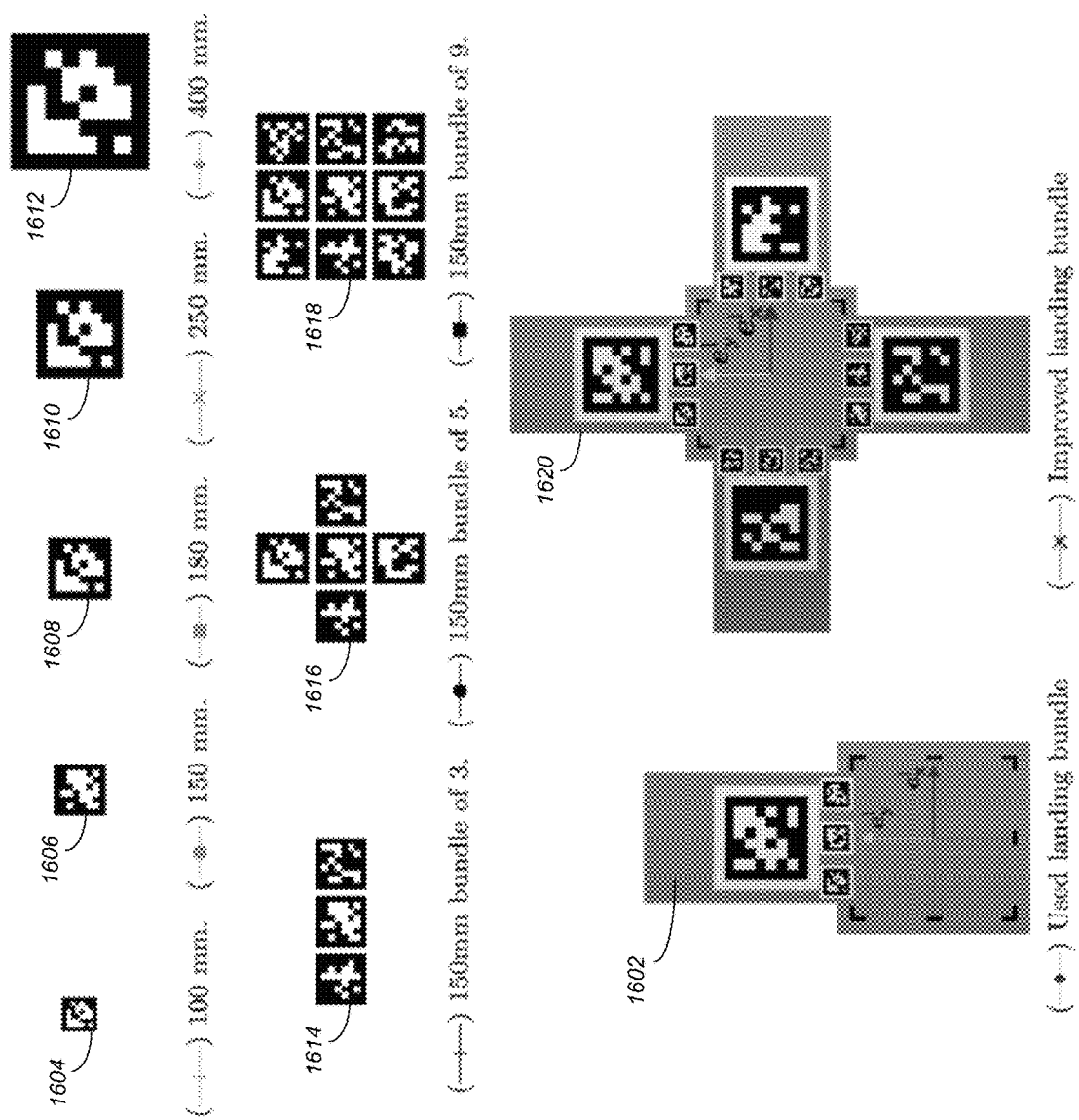
FIG. 16 shows the tag bundle geometries that were tested for simulated measurement noise data collection in accordance with one or more embodiments of the invention.

FIG. 16 shows the tag bundle geometries that were tested for simulated measurement noise data collection in accordance with one or more embodiments of the invention. The goal for using such bundles was to see how individual tag size and bundle geometry affect detection accuracy. Note that the first two rows of bundles (i.e., bundles 1604-1618 ranging from 100 mm to 150 mm bundles of 9) in FIG. 16 are impractical to land on since they would obscure the charging surface. The bundles in the third row (i.e., bundles 1602 and 1620) are therefore placed around the charging area. In testing bundle 1602 was used as the landing bundle while an improved landing bundle would be found with the bundle 1620.

Simulation output demonstrated that a larger tag decreases measurement noise (as seen for the top row single-tag bundles 1604-1612). Importantly, the detection distance of larger tags is larger because they make a bigger pixel footprint in the image. Measurement noise for bundles 1614-1618 in row 2 of FIG. 16 is smaller than for the single-tag bundles; however the five-1616 and nine-tag 1618 bundles do not appear to reduce noise with respect to the three-tag bundle 1614. By using both large and small tags, the landing bundle 1602 used in real-world experiments is able to be detected from large distances of up to 14 m as well as from small distances before touchdown. By offsetting the tags to one side of the charging station, however, the detection accuracy is reduced by the aforementioned lever arm effect. An improved bundle, with tags distributed symmetrically about the target landing location (i.e., bundle 1620), shows better detection performance. However, such a bundle 1620 may be a less practical solution as it takes up a lot more space.

Autonomy Engine

Embodiments of the invention tested the simultaneous operation of the master state machine and the four autopilots for take-off, mission, landing, and emergency landing in four simulated modes of operation. The first nominal flight was the flight illustrated in FIG. 2. In the second flight, a low battery charge aborts the mission and the UAS returns to the charging pad. In the third flight, the UAS spends some time executing a spiral grid search trajectory because the landing marker bundle is initially not visible. In the fourth and final flight, a critically low battery charge forces the UAS to land in-place during the mission because it is now deemed too dangerous to make a safe return to the charging pad. This final scenario is an important robustness mode which reduces the risk of the UAS crashing due to a battery malfunction.

Long-Duration Autonomy and Recharging

Embodiments of the invention further tested the system during a set of indoor and outdoor deployments. For component verification, indoor experiments were initially performed in a motion capture environment (VICON) used for state estimation to verify recharging only (11 hr experiment with 16 flights), and then for full system testing (10.6 hr with 48 flights). The system was then tested outdoors with a mission profile focused on maximizing the number of performed precision landings. This is because precision landing is the most difficult mission phase to execute when taking the UAS from the high-precision indoor motion capture environment to a much lower precision camera, IMU and GPS-based navigation solution outdoors. The outdoor experiment was hence a mission cycle consisting of taking off, flying to several GPS-based waypoints for the duration of about 1 min and then returning to the landing-charging pad for landing and recharging.

Among multiple outdoor deployments, embodiments of the invention achieved a 6 hr tethered and a 4 hr free flight fully autonomous operation during which 22 flights were performed. Based on a breakdown of the times spent in the individual mission phases, it was seen that the UAS spent about 10% of the time collecting data.

Although the objective of the outdoor experiment was repeatable precision landing and not data collection, an onboard thermal camera monitored ground surface temperatures during the course of the experiment and as a result, an exemplary mission data product monitored the surface temperature of a rock formation at different times of day.

Additional Considerations and Improvements

Outdoor operation posed several new challenges that are absent in an indoor environment. First, dirt and dust collecting on the charging pad has at several points prevented a proper contact with the charging pad, hence preventing recharging. Next, camera exposure becomes a crucial factor in outdoor operation where light conditions change throughout the day, sometimes very quickly as clouds block sunlight. As a result, automatic exposure control is important. Accordingly, embodiments of the invention include improvements to the above described implementations and may include adapting exposure control to the expected brightness level of the observed landing target, or by using a different technology like an event-based camera which has been shown to be less susceptible to exposure effects ([Vidal]).

One may also note that GPS accuracy is highly sensitive to electromagnetic interference from nearby emitters such as a WiFi dongle, onboard computer and USB connections ([Davuluri]). As such, a careful hardware design must be performed to maximize outdoor state estimation accuracy and to prevent sudden GPS degradation due to signal interference in mid-flight. Embodiments of the invention may use techniques for vehicle pose estimation that are independent from GPS to operate in GPS degraded or denied environments, such as visual-inertial state estimation (using an onboard camera and IMU) that may be augmented with additional onboard sensors (e.g. Laser Range Finder) or off-board sensors (e.g. Ultra Wide Band radio transmitters or other homing beacons) that are located within the operation area.

From an operational standpoint, the flight time to charging time ratio in various experiments may be low (e.g., 10% flying in data collection mode v. 84% charging, 4% landing, 9% on the mission, and 3% during takeoff). Similar ratios have been observed in the prior art ([Valenti]). The main limiting factors here were the weight of the onboard power supply, which decreased flight times, and a need to guarantee safe LiPo battery operation, which limited the charging current and increased the charging times. Embodiments of the invention may solve such problems by re-engineering the battery/charging pad system or to adapt a battery swapping approach. The software framework of embodiments of the invention can easily accommodate this change.

In summary, long-term platform autonomy outdoors may be hindered by minor issues like dust accumulation, camera exposure, GPS accuracy due to signal interference and software stability. Each challenge may be solved within embodiments of the invention by hardware and software engineering. Further, due to the modular design of embodiments of the invention, the autonomy engine presented herein can readily accommodate any such modification.

Further to the above, several improvements are within the scope of embodiments of the invention. For navigation, a rigorous analysis of latency in the data signals can be used to improve platform accuracy. For precision landing, AprilTag bundle pose measurement frequency may be increased from 7 Hz to gather more data and therefore to improve the estimate of the landing pad pose. To similar effect and to increase the maximum landing approach height, the downfacing camera resolution may be increased (e.g., [GoodRobots] report tag detection from a 32 m altitude using 1080p images). Several improvements are possible for guidance and control. For example, to extend flight time, energy-minimizing optimal trajectories may be generated by solving an optimization problem (e.g., instead of using simple fully constrained polynomials as trajectories). A potential avenue is to adapt existing research on using convex optimization to plan reliable minimum-fuel trajectories for planetary landers ([Açikmeşe]). There is also more direct research for multirotor minimum-energy and minimum-time trajectory generation ([Morbidi]; [Mueller 2015]; [Vicencio]).

On the control side, the experimentation has shown that closed-loop motor RPM control can benefit trajectory tracking accuracy as it effectively renders the motor thrust characteristic independent of battery voltage. This makes the control system less dependent on integrators for error correction.

Embodiments may also include several improvements to the autonomy engine implementation. For example, expandable behavior may be achieved by porting the existing state machines to a framework such as SMC ([Rapp]) which follows the open-closed design pattern of keeping software entities open for extension but closed for modification. In practice, this means that new autonomy engine states may be added without modifying source code for existing states.

Advantages/Benefits

It is desirable to acquire science observations with unmanned aerial vehicles (UAVs) and in technologies for automated real-time operations with such vehicles [Research]. To date, these operations typically have been limited to single deployments with a human in the loop for both launch and retrieval of the UAV and associated data. Embodiments of the invention utilize advanced autonomy that revolutionizes the utilization of UAVs in science by automating the launch, retrieval, data download, and recharging process, thereby enabling UAVs to autonomously conduct sorties many times per day for several months without human intervention. This approach increases the spatial resolution and temporal frequency of Earth science observations far beyond what can be achieved from traditional airborne and orbital platforms, including into locations that cannot be observed from traditional platforms, such as under tree canopies, and including continuous sensing throughout the diurnal cycle (by small autonomous craft) for months at a time.

Embodiments of the invention enables small, autonomous rotorcraft to conduct such missions, initially to study detailed plant physiological response (e.g., land surface temperature) at the scale of individual plants and at the temporal resolution (i.e., at scales not available to airborne or orbital sensors) detect variations in stress and subsequent reductions in productivity, primarily due to heat and water stress. Accordingly, embodiments of the invention enable the ability to capture measurements for monitoring vegetation water use and stress in diverse agricultural settings, with an application for agricultural resource use optimization and satellite or airborne sensor validation. Key capability gaps preventing such missions are addressed (in embodiments of the invention) by (1) showing the feasibility of carrying suitable instruments on appropriate flight paths with such aircraft and (2) developing and demonstrating capabilities for autonomous landing and recharging, position estimation in-flight with poor GPS, to enable unattended, long-duration observations. Embodiments of the invention provide an end-to-end capability for conducting multiple sorties over an extended period of time, with no human intervention.

Embodiments of the invention further include use in the Earth Ventures Suborbital (EVS) program, where UAV-based in-situ observations provide near continuous, detailed coverage of small regions to complement regional and global snapshots from aircraft and satellite observations. In addition, additional embodiments may be utilized in the Mars Exploration Directorate (6X) where UAVs may be used as rover scouts or long distance aerial explorers, and the Solar System Exploration Directorate (4X) for exploring Titan as a daughtercraft of a balloon or lander, with the ability to recharge from the mothership.

In view of the above, embodiments provide an autonomy module that controls all aspects of autonomous operations of the UAV/UAS. This includes the development of a guidance system that executes the different phases of an operation (take-off, mission execution, landing, and re-charging) and additionally implements fail-safe behaviors that are executed in emergencies (e.g. hard- or software failures, or premature energy depletion during flight). The autonomy system was first tested indoors in an 11 hour autonomous operation that included re-charging where the UAS performed 16 sorties without any human intervention. Precision landing on the re-charging station was achieved using visual fiducials on the landing-charging station that are visually detected during approach and landing. For outdoor pose estimation, a sensor fusion filter was implemented to generate high frame rate pose estimates from various on-board sensor inputs (GPS position and velocity, barometric pressure, magnetic field vector, acceleration and angular rates). Pose estimates are used by a hierarchical control algorithm that maneuvers the vehicle based on the goals received from the autonomy system. Different control strategies were implemented for take-off (acceleration based control), mission execution (minimum snap trajectory following) and landing (descend guided by visual detection of landing target). The full system was tested extensively during outdoor tests. Additionally, embodiments of the invention include a vision-based pose estimator that does not rely on GPS information and will serve as a fallback for situations where GPS becomes unavailable (e.g. in GPS shadows) and such an approach was demonstrated on-board a UAV.

Base-Station Computer

Figure 17:
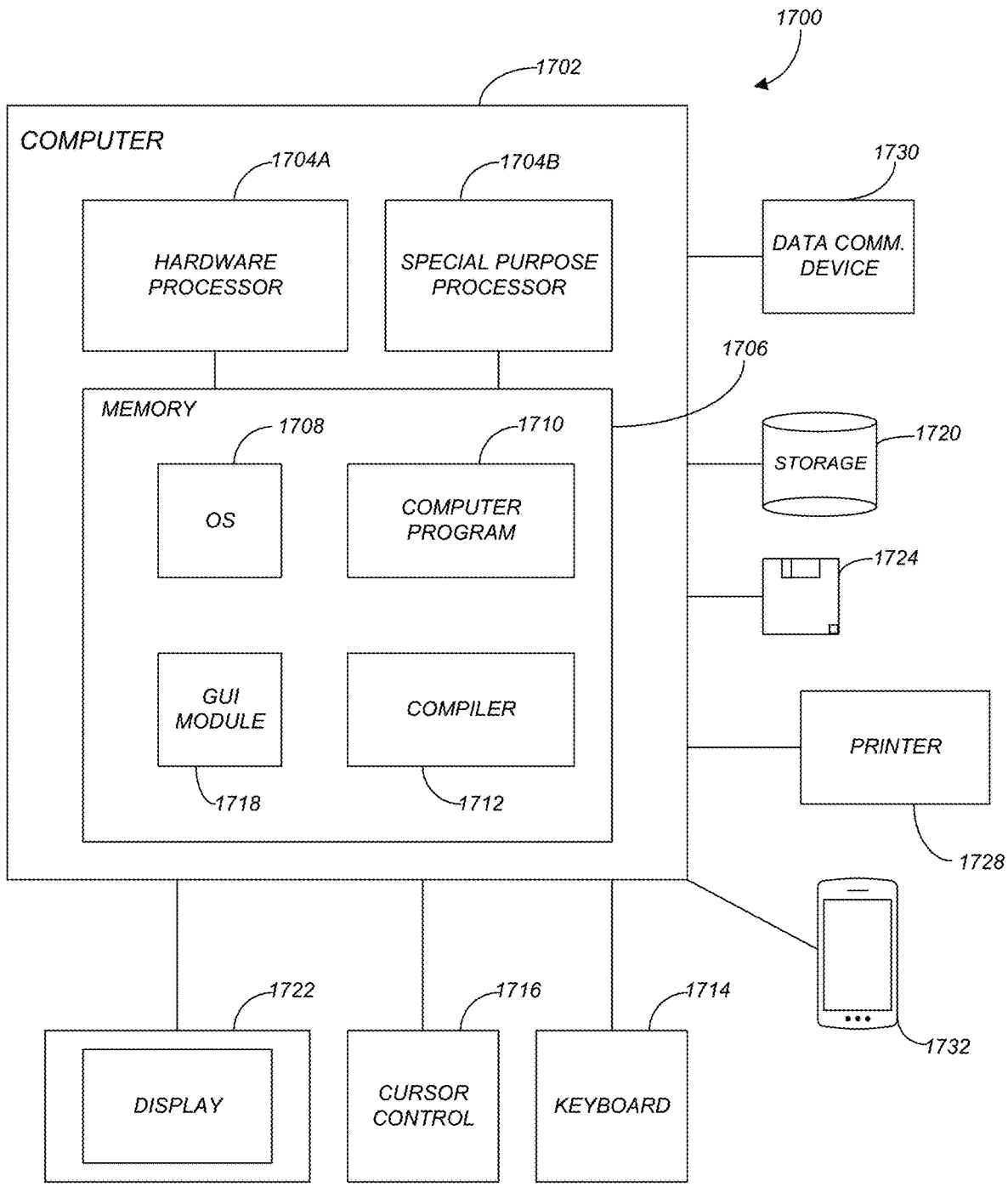
FIG. 17 is an exemplary hardware and software environment used to implement a base-station computer in accordance with one or more embodiments of the invention.

Embodiments of the invention may utilize/include a base-station computer that is integrated into/connected to the landing-charging stations. FIG. 17 is an exemplary hardware and software environment 1700 (referred to as a computer-implemented system and/or computer-implemented method) used to implement such a base-station computer. The hardware and software environment includes a computer 1702 and may include peripherals. Computer 1702 may be a user/client computer, server computer, or may be a database computer. The computer 1702 comprises a hardware processor 1704A and/or a special purpose hardware processor 1704B (hereinafter alternatively collectively referred to as processor 1704) and a memory 1706, such as random access memory (RAM). The computer 1702 may be coupled to, and/or integrated with, other devices, including input/output (I/O) devices such as a keyboard 1714, a cursor control device 1716 (e.g., a mouse, a pointing device, pen and tablet, touch screen, multi-touch device, etc.) and a printer 1728. In one or more embodiments, computer 1702 may be coupled to, or may comprise, a portable or media viewing/listening device 1732 (e.g., an MP3 player, IPOD, NOOK, portable digital video player, cellular device, personal digital assistant, etc.). In yet another embodiment, the computer 1702 may comprise a multi-touch device, mobile phone, gaming system, internet enabled television, television set top box, or other internet enabled device executing on various platforms and operating systems.

In one embodiment, the computer 1702 operates by the hardware processor 1704A performing instructions defined by the computer program 1710 (e.g., a computer-aided design [CAD] application) under control of an operating system 1708. The computer program 1710 and/or the operating system 1708 may be stored in the memory 1706 and may interface with the user and/or other devices to accept input and commands and, based on such input and commands and the instructions defined by the computer program 1710 and operating system 1708, to provide output and results.

Output/results may be presented on the display 1722 or provided to another device for presentation or further processing or action. In one embodiment, the display 1722 comprises a liquid crystal display (LCD) having a plurality of separately addressable liquid crystals. Alternatively, the display 1722 may comprise a light emitting diode (LED) display having clusters of red, green and blue diodes driven together to form full-color pixels. Each liquid crystal or pixel of the display 1722 changes to an opaque or translucent state to form a part of the image on the display in response to the data or information generated by the processor 1704 from the application of the instructions of the computer program 1710 and/or operating system 1708 to the input and commands. The image may be provided through a graphical user interface (GUI) module 1718. Although the GUI module 1718 is depicted as a separate module, the instructions performing the GUI functions can be resident or distributed in the operating system 1708, the computer program 1710, or implemented with special purpose memory and processors.

In one or more embodiments, the display 1722 is integrated with/into the computer 1702 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 1702 according to the computer program 1710 instructions may be implemented in a special purpose processor 1704B. In this embodiment, some or all of the computer program 1710 instructions may be implemented via firmware instructions stored in a read only memory (ROM), a programmable read only memory (PROM) or flash memory within the special purpose processor 1704B or in memory 1706. The special purpose processor 1704B may also be hardwired through circuit design to perform some or all of the operations to implement the present invention. Further, the special purpose processor 1704B may be a hybrid processor, which includes dedicated circuitry for performing a subset of functions, and other circuits for performing more general functions such as responding to computer program 1710 instructions. In one embodiment, the special purpose processor 1704B is an application specific integrated circuit (ASIC).

The computer 1702 may also implement a compiler 1712 that allows an application or computer program 1710 written in a programming language such as C, C++, Assembly, SQL, PYTHON, PROLOG, MATLAB, RUBY, RAILS, HASKELL, or other language to be translated into processor 1704 readable code. Alternatively, the compiler 1712 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1710 accesses and manipulates data accepted from I/O devices and stored in the memory 1706 of the computer 1702 using the relationships and logic that were generated using the compiler 1712.

The computer 1702 also optionally comprises an external communication device such as a modem, satellite link, Ethernet card, or other device for accepting input from, and providing output to, other computers 1702 and/or the UAS.

In one embodiment, instructions implementing the operating system 1708, the computer program 1710, and the compiler 1712 are tangibly embodied in a non-transitory computer-readable medium, e.g., data storage device 1720, which could include one or more fixed or removable data storage devices, such as a zip drive, floppy disc drive 1724, hard drive, CD-ROM drive, tape drive, etc. Further, the operating system 1708 and the computer program 1710 are comprised of computer program 1710 instructions which, when accessed, read and executed by the computer 1702, cause the computer 1702 to perform the steps necessary to implement and/or use the present invention or to load the program of instructions into a memory 1706, thus creating a special purpose data structure causing the computer 1702 to operate as a specially programmed computer executing the method steps described herein. Computer program 1710 and/or operating instructions may also be tangibly embodied in memory 1706 and/or data communications devices 1730, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1702.

Figure 18:
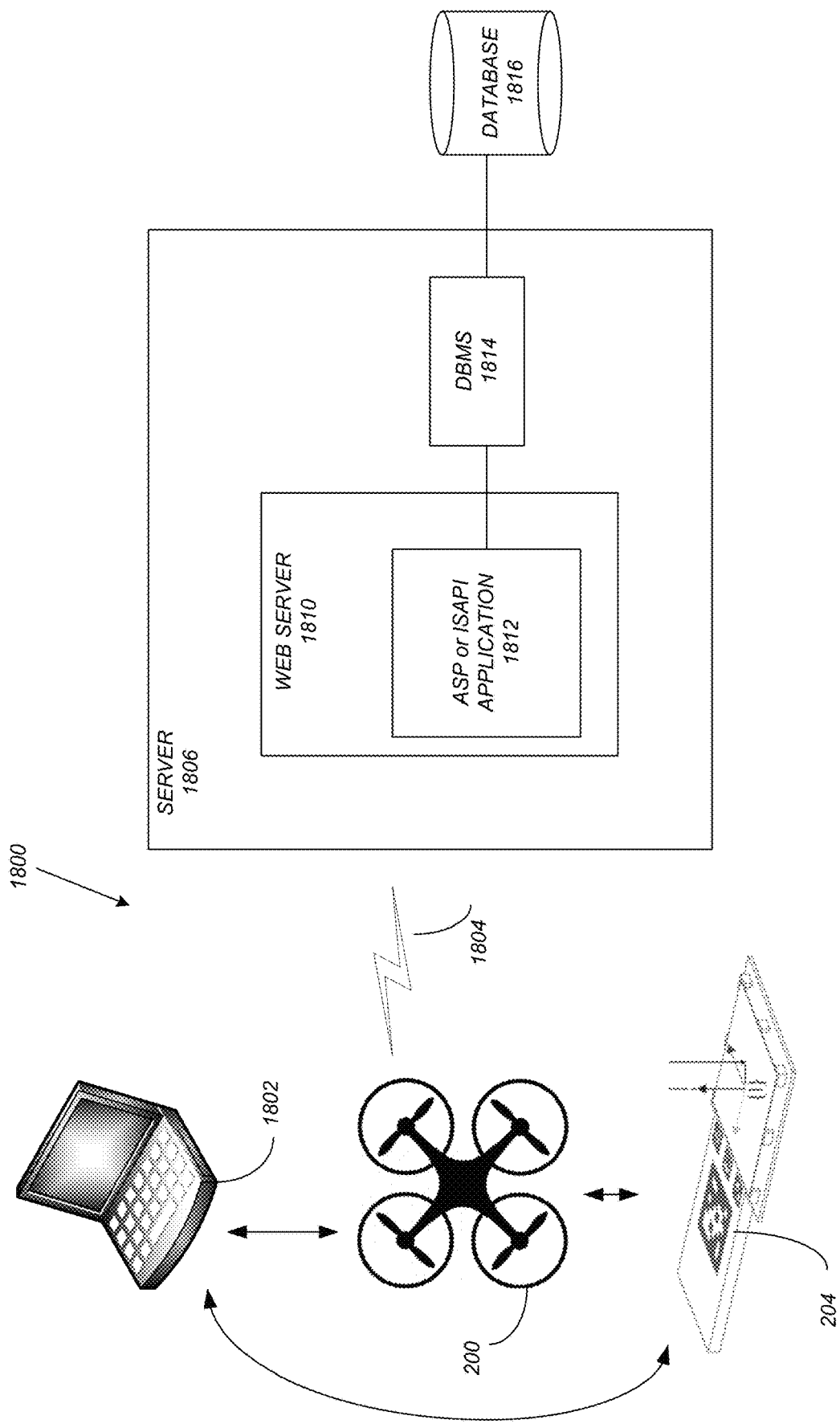
FIG. 18 schematically illustrates a typical distributed/cloud-based computer system using a network to connect client computers, UAS, and/or land-charging stations to server computers and/or to each other in accordance with one or more embodiments of the invention.

FIG. 18 schematically illustrates a typical distributed/cloud-based computer system 1800 using a network 1804 to connect client computers 1802 (which may be laptop computer, desktop computers, etc.), UAS 200, and/or land-charging stations 204 to server computers 1806 and/or to each other. A typical combination of resources may include a network 1804 comprising the Internet, LANs (local area networks), WANs (wide area networks), SNA (systems network architecture) networks, or the like, clients 1802 that are personal computers, workstations, and/or are integrated into landing-charging stations 204 (as set forth in FIG. 17), and servers 1806 that are personal computers, workstations, minicomputers, or mainframes (as set forth in FIG. 17). However, it may be noted that different networks such as a cellular network (e.g., GSM [global system for mobile communications] or otherwise), a satellite based network, or any other type of network may be used to connect clients 1802 and servers 1806 in accordance with embodiments of the invention.

A network 1804 such as the Internet connects clients 1802 to server computers 1806. Network 1804 may utilize ethernet, coaxial cable, wireless communications, radio frequency (RF), etc. to connect and provide the communication between clients 1802 and servers 1806. Further, in a cloud-based computing system, resources (e.g., storage, processors, applications, memory, infrastructure, etc.) in clients 1802 and server computers 1806 may be shared by clients 1802, server computers 1806, and users across one or more networks. Resources may be shared by multiple users and can be dynamically reallocated per demand. In this regard, cloud computing may be referred to as a model for enabling access to a shared pool of configurable computing resources.

Clients 1802 may execute a client application or web browser and communicate with server computers 1806 executing web servers 1810. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 1802 may be downloaded from server computer 1806 to client computers 1802 and installed as a plug-in or ACTIVEX control of a web browser. Accordingly, clients 1802 may utilize ACTIVEX components/component object model (COM) or distributed COM (DCOM) components to provide a user interface on a display of client 1802. The web server 1810 is typically a program such as MICROSOFT'S INTERNET INFORMATION SERVER.

Web server 1810 may host an Active Server Page (ASP) or Internet Server Application Programming Interface (ISAPI) application 1812, which may be executing scripts. The scripts invoke objects that execute business logic (referred to as business objects). The business objects then manipulate data in database 1816 through a database management system (DBMS) 1814. Alternatively, database 1816 may be part of, or connected directly to, client 1802 instead of communicating/obtaining the information from database 1816 across network 1804. When a developer encapsulates the business functionality into objects, the system may be referred to as a component object model (COM) system. Accordingly, the scripts executing on web server 1810

(and/or application 1812) invoke COM objects that implement the business logic. Further, server 1806 may utilize MICROSOFT'S TRANSACTION SERVER (MTS) to access required data stored in database 1816 via an interface such as ADO (Active Data Objects), OLE DB (Object Linking and Embedding DataBase), or ODBC (Open DataBase Connectivity).

Generally, these components 1800-1816 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1802 and 1806 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1802 and 1806. Embodiments of the invention are implemented as a software/CAD application on a client 1802 or server computer 1806. Further, as described above, the client 1802 or server computer 1806 may comprise a thin client device or a portable device that has a multi-touch-based display.

CONCLUSION

This concludes the description of the preferred embodiment of the invention. The following describes some alternative embodiments for accomplishing the present invention. Embodiments of the invention provide an architecture for a long-duration fully autonomous UAS for remote-sensing data acquisition missions. Such a system is crucial in enabling precision agriculture and other applications that require a long-term remote-sensing capability such as environmental monitoring and surveillance. Embodiments of the invention include two major components: a fully autonomous aerial vehicle and a landing station which integrates a charging pad. The aerial vehicle carries autonomy software which enables it to perpetually execute a user-defined mission and to downlink collected data to a base station computer. Experimental results demonstrate that such a system can operate in several environments of increasing complexity, culminating in a fully autonomous 4 hr outdoor operation in which 10% of the time was spent flying to collect data.

Thus, embodiments of the invention demonstrate the ability to operate a small rotorcraft UAV completely autonomously over extended periods of time using a precision landing and re-charging strategy, Once deployed, the vehicle executes its mission without any human intervention, which includes data downloading during re-charging. Accordingly, embodiments of the invention provide a system that controls all aspects of autonomous operation including fail-safe behaviors that are executed in emergencies (e.g., hard or software failures, or premature energy depletion during flight). Further, embodiments provide a sensor fusion filter for outdoor state estimation to include measurements from various on-board sensors (GPS, barometer, magnetometer, IMU). In addition, embodiments of the invention include precision landing capability using visual markers on re-charging stations that are detected during approach and landing. Embodiments also provide an extended state estimation approach to include a state-of-the-art map-free visual-inertial fusion filter based on MSCKF (multi-state constraint Kalman Filter) for navigation in GPS-denied environments. Such a system will revolutionize long-term monitoring tasks in earth science application—repeatedly delivering very high-resolution science data which is not available from other remote sensing systems.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[Zarco-Tejada] Zarco-Tejada, P. J., et al., "Fluorescence, temperature and narrow-band indices acquired from a UAV platform for water stress detection using a micro-hyperspectral imager and a thermal camera", Remote Sensing of Environment (2011);

[Lynen] Lynen, S., Achtelik, M. W., Weiss, S., Chli, M., and Siegwart, R., "A robust and modular multi-sensor fusion approach applied to MAV navigation", 2013, IEEE/RSJ Int'l Conf. on Intelligent Robots and Systems;

[Mulgaonkar] Mulgaonkar, Y. and Kumar, V., "Autonomous charging to enable long-endurance missions for small aerial robots"; 2014, SPIE Defense and Security Symposium;

[Matthies] Matthies, L., Brockers; R., Kuwata, Y., and Weiss, S., "Stereo vision-based obstacle avoidance for micro air vehicles using disparity space", ICRA 2014;

[Research] Research Opportunities in Space and Earth Sciences—2014, Appendix A.41: Advanced Information Systems Technology;

[Shen] Shen; S., Michael, N.; and Kumar, V. "Autonomous multi-floor indoor navigation with a computationally constrained MAV", ICRA 2011;

[Mourikis] Mourikis et al, "A Multi-State Constraint Kalman Filter for Vision-Aided Inertial Navigation", *Proc. of the IEEE Int. Conf on Robotics and Automation*, (2007);

[Li] Li, M. "Visual-Inertial Odometry for Resource-Constrained Systems", PhD thesis at University of California at Riverside, (2014);

[Achtelik] Achtelik, M., Achtelik, M., Weiss, S., & Kneip, L. (2017). asctec_mav_frame-work. Retrieved from http://wiki.ros.org/asctec_mav_framework

[Açıkmeşe] Açıkmeşe, B., & Ploen, S. R. (2007). Convex programming approach to powered descent guidance for Mars landing. *AIAA Journal of Guidance, Control, and Dynamics,* 30(5), 1353-1366.

[Aldhaher] Aldhaher, S., Mitcheson, P. D., Arteaga, J. M., Kkelis, G., & Yates, D. C. (2017). Light-weight wireless power transfer for mid-air charging of drones (pp. 336-340). Paris, France: European Conference on Antennas and Propagation (EUCAP).

[Amazon] Amazon. (2016). *Amazon Prime Air's first customer delivery*. Retrieved from https://www.youtube.com/watch?v=vNySOrl2Ny8;

[APRIL Laboratory] APRIL Laboratory. (2016). *AprilTags visual fiducial system*. Retrieved from https://april.eecs.umich.edu/software/apriltag;

[Bencina] Bencina, R., Kaltenbrunner, M., & Jorda, S. (2005). Improved topological fiducial tracking in the reacTIVision system (pp. 1-8). San Diego, USA: IEEE Computer Society Conference on Computer Vision and Pattern Recognition (CVPR);

[Bergamasco] Bergamasco, F., Albarelli, A., Cosmo, L., Rodola, E., & Torsello, A. (2016). An accurate and robust artificial marker based on cyclic codes. *IEEE Transactions on Pattern Analysis and Machine Intelligence*, 38(12), 2359-2373;

[Blackmore] Blackmore, L., Açıkmeşe, B., & Scharf, D. P. (2010). Minimum-landing-error powered-descent guidance for Mars landing using convex optimization. *AIAA Journal of Guidance, Control, and Dynamics*, 33(4), 1161-1171;

[Borowczyk] Borowczyk, A., Nguyen, D.-T., Nguyen, A. P.-V., Nguyen, D. Q., Saussié, D., & Ny, J. L. (2017). Autonomous landing of a multirotor micro air vehicle on a high velocity ground vehicle. *20th IFAC World Congress*, 50, 10488-10494.

[Brescianini] Brescianini, D., Hehn, M., & D'Andrea, R. (2013). *Nonlinear quadrocopter attitude control* (Technical Report No. 009970340). Zurich: ETH Zürich, Departement Maschinenbau and Verfahrenstechnik.

[Brockers 2011] Brockers, R., Bouffard, P., Ma, J., Matthies, L., & Tomlin, C. (2011). Autonomous landing and ingress of micro-air-vehicles in urban environments based on monocular vision (8031, pp. 1-12). Orlando, Florida: Micro- and Nanotechnology Sensors, Systems, and Applications III;

[Brockers 2012] Brockers, R., Susca, S., Zhu, D., & Matthies, L. (2012). Fully self-contained vision-aided navigation and landing of a micro air vehicle independent from external sensor inputs (8387, pp. 1-10). Baltimore, Maryland: SPIE Unmanned Systems Technology XIV;

[Brommer] Brommer, C., Malyuta, D., Hentzen, D., & Brockers, R. (2018). Long-duration autonomy for small rotorcraft UAS including recharging (pp. 7252-7258). Madrid, Spain: IEEE/RSJ International Conference on Intelligent Robots and Systems (IROS);

[Burri] Burri, M., Oleynikova, H., Achtelik, M. W., & Siegwart, R. (2015). Real-time visual-inertial mapping, re-localization and planning onboard MAVs in unknown environments (pp. 1872-1878). Hamburg, Germany: IEEE/RSJ International Conference on Intelligent Robots and Systems (IROS);

[Chaves] Chaves, S. M., Wolcott, R. W., & Eustice, R. M. (2015). NEEC research: Toward GPS-denied landing of unmanned aerial vehicles on ships at sea. *Naval Engineers Journal*, 127(1), 23-35.

[Davuluri] Davuluri, P., & Chen, C. (2013). Radio frequency interference due to USB3 connector radiation (pp. 632-635). Denver, Colorado: IEEE International Symposium on Electromagnetic Compatibility;

[de Almeida] de Almeida, M. M., & Akella, M. (2017). New numerically stable solutions for minimum-snap quadcopter aggressive maneuvers (pp. 1322-1327). Seattle, Washington: American Control Conference (ACC);

[Devernay] Devernay, F., & Faugeras, 0. (2001). Straight lines have to be straight. *Machine Vision and Applications*, 13(1), 14-24;

[Faessler 2017] Faessler, M., Falanga, D., & Scaramuzza, D. (2017). Thrust mixing, saturation, and body-rate control for accurate aggressive quadrotor flight. *IEEE Robotics and Automation Letters*, 2(2), 476-482.

[Faessler 2015] Faessler, M., Fontana, F., Forster, C., & Scaramuzza, D. (2015). Automatic re-initialization and failure recovery for aggressive flight with a monocular vision-based quadrotor (pp. 1722-1729). Seattle, Washington: IEEE International Conference on Robotics and Auto-mation (ICRA).

[Fiala] Fiala, M. (2005). ARTag, a fiducial marker system using digital techniques (pp. 1-7). San Diego, Califronia: IEEE Computer Society Conference on Computer Vision and Pattern Recognition (CVPR).

[Food] Food and Agriculture Organization of the United Nations. (2009). 2050: *A third more mouths to feed*. Retrieved from http://www.fao.org/news/story/en/item/35571/i code/;

[Forster 2015] Forster, C., Faessler, M., Fontana, F., Werlberger, M., & Scaramuzza, D. (2015). Continuous onboard monocular-vision-based elevation mapping applied to autonomous landing of micro aerial vehicles (pp. 111-118). Seattle, Washington: IEEE International Conference on Robotics and Automation (ICRA);

[Forster 2014] Forster, C., Pizzoli, M., & Scaramuzza, D. (2014). SVO: Fast semi-direct monocular visual odometry (pp. 15-22). Hong Kong, China: IEEE International Conference on Robotics and Automation (ICRA).

[Furrer] Furrer, F., Burri, M., Achtelik, M., & Siegwart, R. (2016). RotorS-A modular gazebo MAV simulator framework. In Koubaa, A. (Ed.), *Robot operating system (ROS)—The complete reference* (1, pp. 595-625). Heidelberg, Germany: Springer.

[Goldman Sachs] Goldman Sachs. (2017). *Drones: Reporting for work*. Retrieved from http://www.goldmansachs.com/our-thinking/technology-driving-innovation/drones/;

[GoodRobots] GoodRobots. (2019). *vision_landing*. Retrieved from https://github.com/goodrobots/vision_landing;

[Grewal] Grewal, M. S., Weill, L. R., & Andrews, A. P. (2007). *Global positioning systems, inertial navigation, and integration*. Hoboken, NJ: Wiley.

[Hast] Hast, A., Nysjo, J., & Marchetti, A. (2013). Optimal RANSAC—Towards a repeatable algorithm for finding the optimal set. *Journal of WSCG*, 21(1), 21-30;

[Jin 2017] Jin, P., Matikainen, P., & Srinivasa, S. S. (2017). Sensor fusion for fiducial tags: Highly robust pose estimation from single frame RGBD (pp. 5770-5776). Vancouver, Canada: IEEE/RSJ International Conference on Intelligent Robots and Systems (IROS);

[Jin 2016] Jin, S., Zhang, J., Shen, L., & Li, T. (2016). On-board vision autonomous landing techniques for quadrotor: A survey (pp. 10284-10289). Chengdu, China: Chinese Control Conference (CCC);

[Klein] Klein, G., & Murray, D. (2007). Parallel tracking and mapping for small AR workspaces (pp. 1-10). Nara, Japan: IEEE and ACM International Symposium on Mixed and Augmented Reality.

[Koenig] Koenig, N., & Howard, A. (2004). Design and use paradigms for Gazebo, an open-source multi-robot simulator (pp. 2149-2154). Sendai, Japan: IEEE/RSJ International Conference on Intelligent Robots and Systems (IROS).

[Kyristsis] Kyristsis, S., Antonopoulos, A., Chanialakis, T., Stefanakis, E., Linardos, C., Tripolitsiotis, A., & Partsinevelos, P. (2016). Towards autonomous modular UAV missions: The detection, geo-location and landing paradigm. *Sensors*, 16(11), 1844.

[Ling] Ling, K. (2014). *Precision landing of a quadrotor UAV on a moving target using low-cost sensors* (Master's Thesis). University of Waterloo, Waterloo.

[Lupashin] Lupashin, S., Hehn, M., Mueller, M. W., Schoellig, A. P., Sherback, M., & D'Andrea, R. (2014). A platform for aerial robotics research and demonstration: The flying machine arena. *Mechatronics,* 24(1), 41-54;

[Malyuta] Malyuta, D. (2018). *Guidance, navigation, control and mission logic for quadrotor full-cycle autonomy* (Master's Thesis). ETH Zurich, Zurich;

[Mellinger] Mellinger, D., & Kumar, V. (2011). Minimum snap trajectory generation and control for quadrotors (pp. 2520-2525). Shanghai, China: IEEE International Conference on Robotics and Automation (ICRA);

[Morbidi] Morbidi, F., Cano, R., & Lara, D. (2016). Minimum-energy path generation for a quadrotor UAV (pp. 1492-1498). Stockhold, Sweden: IEEE International Conference on Robotics and Automation (ICRA);

[Mueller 2012] Mueller, M. W., & D'Andrea, R. (2012). Critical subsystem failure mitigation in an indoor UAV testbed (pp. 780-785). Vilamoura, Portugal: IEEE/RSJ International Conference on Intelligent Robots and Systems (IROS);

[Mueller 2013] Mueller, M. W., & D'Andrea, R. (2013). A model predictive controller for quadrocopter state interception (pp. 1383-1389). Zurich, Switzer-land: European Control Conference (ECC);

[Mueller 2015] Mueller, M. W., Hehn, M., & D'Andrea, R. (2015). A computationally efficient motion primitive for quadrocopter trajectory generation. *IEEE Transactions on Robotics,* 31(6), 1294-1310;

[Mulgaonkar] Mulgaonkar, Y., & Kumar, V. (2014). Autonomous charging to enable long-endurance missions for small aerial robots (pp. 1-15). Baltimore, Maryland: Micro- and Nanotechnology Sensors, Systems, and Applications VI;

[Nissler] Nissler, C., Buttner, S., Marton, Z.-C., Beckmann, L., & Thomasy, U. (2016). Evaluation and improvement of global pose estimation with multiple AprilTags for industrial manipulators (pp. 1-8). Berlin, Germany: IEEE International Conference on Emerging Technologies and Factory Automation (ETFA);

[Olson] Olson, E. (2011). AprilTag: A robust and flexible visual fiducial system (pp. 3400-3407). Shanghai, China: IEEE International Conference on Robotics and Automation (ICRA);

[OpenCV] OpenCV. (2017). cv::solvePnP. Retrieved from https://docs.opencv.org/3.3.1/d9/d0c/group_calib3d.html#ga549c2075fac14829ff4a58bc931c033d

[Rapp] Rapp, C., Suez, E., Perrad, F., Liscio, C., Arnold, T., & Krajcovic, G. (2017). *SMC: The state machine compiler.* Retrieved from http://smc.sourceforge.net/;

[Richter] Richter, C., Bry, A., & Roy, N. (2016). Polynomial trajectory planning for aggressive quadrotor flight in dense indoor environments, *Springer tracts in advanced robotics* (114, pp. 649-666). Heidelberg, Germany: Springer;

[Rublee] Rublee, E., Rabaud, V., Konolige, K., & Bradski, G. (2011). ORB: An efficient alternative to SIFT or SURF (pp. 2564-2571). Barcelona, Spain: IEEE International Conference on Computer Vision (ICCV);

[Skogestad] Skogestad, S., & Postlethwaite, I. (2005). *Multivariable feedback control: Analysis and design* (2 edition.). Chichester, England: Wiley;

[Skysense] Skysense. (2018). *Skysense charging pad.* Retrieved from https://www.skysense.co/charging-pad-outdoor;

[Suzuki] Suzuki, K. A. O., Filho, P. K., & Morrison, J. R. (2011). Automatic battery replacement system for UAVs: Analysis and design. *Journal of Intelligent and Robotic Systems,* 65(1-4), 563-586;

[Toksoz] Toksoz, T., Redding, J., Michini, M., Michini, B., How, J., Vavrina, M., & Vian, J. (2011). Automated battery swap and recharge to enable persistent UAV missions (pp. 1-10). St. Louis, Missouri: AIAA Infotech@Aerospace;

[Valenti] Valenti, M., Dale, D., How, J., de Farias, D. P., & Vian, J. (2007). Mission health management for 24/7 persistent surveillance operations (pp. 1-18). Hilton Head, South Carolina: AIAA Guidance, Navigation and Control Conference and Exhibit;

[Vicencio] Vicencio, K., Korras, T., Bordignon, K. A., & Gentilini, I. (2015). Energy-optimal path planning for six-rotors on multi-target missions (pp. 2481-2487). Hamburg, Germany: IEEE/RSJ International Conference on Intelligent Robots and Systems (IROS);

[Vidal] Vidal, A. R., Rebecq, H., Horstschaefer, T., & Scaramuzza, D. (2018). Ultimate SLAM? Combining events, images, and IMU for robust visual SLAM in HDR and high-speed scenarios. *IEEE Robotics and Automation Letters,* 3(2), 994-1001;

[Vincent] Vincent, J. (2017). *Google's Project Wing has successfully tested its air traffic control system for drones.* Retrieved from https://www.theverge.com/2017/6/8/15761220/google-project-wing-drone-air-traffic-control-tests;

[Wang] Wang, J., & Olson, E. (2016). AprilTag 2: Efficient and robust fiducial detection (pp. 4193-4198). Daej eon, South Korea: IEEE/RSJ International Conference on Intelligent Robots and Systems (IROS);

[Weiss] Weiss, S., Achtelik, M. W., Chli, M., & Siegwart, R. (2012). Versatile distributed pose estimation and sensor self-calibration for an autonomous MAV (pp. 31-38). Saint Paul, Minnesota: IEEE International Conference on Robotics and Automation (ICRA);

[Wingtra] Wingtra. (2017). *How it works.* Retrieved from https://wingtra.com/workflow/;

[Xu] Xu, A., & Dudek, G. (2011). Fourier tag: A smoothly degradable fiducial marker system with configurable payload capacity (pp. 40-47). St. Johns, Canada: Canadian Conference on Computer and Robot Vision;

[Yang] Yang, S., Scherer, S. A., & Zell, A. (2012). An onboard monocular vision system for autonomous take-off, hovering and landing of a micro aerial vehicle. *Journal of Intelligent & Robotic Systems,* 69(1-4), 499-515.

What is claimed is:

1. A method for autonomously operating an unmanned aerial system (UAS), comprising:
  (a) the UAS autonomously taking off from a take-off landing-charging station;
  (b) the UAS autonomously executing a mission based on a mission plan, wherein:
    (1) the executing comprises the UAS autonomously observing data during flight;
    (2) the executing comprises the UAS autonomously updating the mission plan based on the observed data; and (3) the mission comprises a set of waypoints connected by individual trajectory segments, wherein the individual trajectory segments are autonomously generated onboard the UAS;
(c) the UAS autonomously traveling to a hover position above a target landing-charging station;
(d) the UAS autonomously precision landing on the target landing-charging station, wherein the precision landing comprises:
  (1) the UAS utilizing a camera to detect a landing bundle comprised of multiple tag fiducials, wherein a placement of the multiple tag fiducials around a charging area of the target landing-charging station will not obscure the charging area;
  (2) the UAS performing a landing bundle calibration by:
    (A) calibrating the camera and the multiple tag fiducials based on:
      a camera frame of the camera;
      a master tag of the multiple tag fiducials;
      additional tags of the multiple tag fiducials; and
      a position and altitude of each additional tag relative to the master tag:
    (B) orienting the camera downfacing with the landing bundle visible to form a rigid body transform triad, wherein the rigid body transform triad is comprised of the camera frame, the master tag, and one or more of the additional tags;
    (C) collecting a sequence of multiple calibration transforms based on the rigid body transform triad;
    (D) combining the multiple calibration transforms to generate a geometric position and an attitude of each of the multiple tag fiducials relative to a landing pad frame;
  (3) based on the landing bundle calibration, the UAS utilizing a bundle pose measurement algorithm to produce a bundle pose measurement of the target landing charging-station in a world frame;
  (4) utilizing the bundle pose measurement to generate a yaw measurement wherein the bundle pose measurement and yaw measurement are used for landing navigation;
  (5) the UAS autonomously realigning itself, using a landing pose estimate, with the target landing-charging station, wherein the realignment is necessary due to drift;
  (6) the UAS autonomously determining and issuing a new trajectory to the target landing-charging station; and
  (7) the UAS autonomously following the new trajectory to land on the target landing-charging station;
(e) the UAS autonomously re-charging via the target landing-charging station, wherein once re-charged, the UAS is ready to execute a next sortie; and
(f) when landed, the UAS autonomously transmitting mission data,
wherein the UAS autonomously performs the above steps onboard the UAS without any human intervention.

2. The method of claim 1, wherein the taking off comprises:
validating motor nominal performance of the UAS prior to take-off; and
storing a current location, in a local frame, of the UAS on the take-off landing-charging station to a database in permanent memory, wherein the current location provides knowledge of where to return after the mission.

3. The method of claim 1, wherein the mission is updated by onboard autonomy software based on decisions made using mission data acquired during flight.

4. The method of claim 1, wherein the take-off landing-charging station is the target landing-charging station.

5. The method of claim 1, wherein the precision landing is based on a vehicle pose estimation.

6. The method of claim 1, wherein the precision landing is based on a control method that rejects external disturbances via a three-stage cascaded control architecture.

7. The method of claim 1, further comprising:
the UAS repeating steps (a)-(f) for multiple sorties without any human intervention.

8. The method of claim 1, further comprising:
the UAS autonomously monitoring a system health.

9. The method of claim 8, further comprising:
determining that an in-flight emergency has occurred and either returning to the take-off landing-charging station or performing an emergency landing dependent upon conditions of the in-flight emergency.

10. The method of claim 1, wherein the UAS comprises:
onboard navigation sensors; and
software for executing onboard autonomy.

11. The method of claim 1, wherein:
the detecting of the landing bundle comprises obtaining a single-pose measurement using all of the multiple tag fiducials at once; and
the realigning comprises rotating the UAS to improve an image of the multiple tag fiducials and result in a pad-aligned pose based on the multiple tag fiducials.

12. The method of claim 11, wherein:
the calibrating isolates an effect of bundle geometry where a tag bundle geometry and camera-tag distance are the only independent variables;
the multiple tag fiducials comprise a first size tag fiducial of a first size and a second size tag fiducials of a second size;
the second size is larger than the first size;
the second size tag fiducial enables detection from a higher altitude compared to the first size tag fiducial;
placement of multiple first size tag fiducials around the charging area of the target landing-charging station will not obscure the charging area; and
the multiple first size tag fiducials are distributed symmetrically about the target landing-charging station.

13. The method of claim 1, wherein:
the UAS precision lands using an event based camera that accounts for exposure effects relating to the target landing-charging station.

14. The method of claim 1, wherein:
the UAS precision lands using a thermal camera.

15. An unmanned aerial system (UAS) comprising:
(a) a take-off landing-charging station and a target landing-charging station; and
(b) a UAS vehicle comprising:
  (i) one or more rotors for operating the UAS vehicle aerially;
  (ii) a processor;
  (iii) software executed by the processor for conducting onboard autonomy on the UAS vehicle, wherein the software causes the UAS vehicle to:
    (A) autonomously take off from the take-off landing-charging station;
    (B) autonomously execute a mission based on a mission plan, wherein:
      (1) the executing comprises the UAS vehicle autonomously observing data during flight;

(2) the executing comprises the UAS vehicle autonomously updating the mission plan based on the observed data; and (3) the mission comprises a set of waypoints connected by individual trajectory segments, wherein the individual trajectory segments are autonomously generated onboard the UAS;

(C) autonomously travel to a hover position above a target landing-charging station;

(D) autonomously precision land on the target landing-charging station, wherein the precision landing comprises:

(1) utilizing a camera to detect a landing bundle comprised of multiple tag fiducials, wherein a placement of the multiple tag fiducials around a charging area of the target landing-charging station will not obscure the charging area;

(2) performing a landing bundle calibration by:

(A) calibrating the camera and the multiple tag fiducials based on:
a camera frame of the camera;
a master tag of the multiple tag fiducials;
additional tags of the multiple tag fiducials; and
a position and altitude of each additional tag relative to the master tag:

(B) orienting the camera downfacing with the landing bundle visible to form a rigid body transform triad, wherein the rigid body transform triad is comprised of the camera frame, the master tag, and one or more of the additional tags;

(C) collecting a sequence of multiple calibration transforms based on the rigid body transform triad;

(D) combining the multiple calibration transforms to generate a geometric position and an attitude of each of the multiple tag fiducials relative to a landing pad frame;

(3) based on the landing bundle calibration, utilizing a bundle pose measurement algorithm to produce a bundle pose measurement of the target landing charging-station in a world frame;

(4) utilizing the bundle pose measurement to generate a yaw measurement wherein the bundle pose measurement and yaw measurement are used for landing navigation;

(5) the UAS autonomously realigning itself, using a landing pose estimate, with the target landing-charging station, wherein the realignment is necessary due to drift;

(6) the UAS autonomously determining and issuing a new trajectory to the target landing-charging station; and (7) the UAS autonomously following the new trajectory to land on the target landing-charging station;

(E) autonomously re-charge via the target landing-charging station, wherein once re-charged, the UAS vehicle is ready to execute a next sortie; and (F) autonomously transmit mission data, and wherein the software is executed by the processor onboard the UAS vehicle without any human intervention.

16. The UAS of claim 15, wherein the autonomous take off comprises:

validating motor nominal performance of the UAS prior to take-off; and storing a current location, in a local frame, of the UAS on the take-off landing-charging station to a database in permanent memory, wherein the current location provides knowledge of where to return after the mission.

17. The UAS of claim 15, wherein the mission is updated by an onboard autonomy software based on decisions made using mission data acquired during flight.

18. The UAS of claim 15, wherein the take-off landing-charging station is the target landing-charging station.

19. The UAS of claim 15, wherein the autonomous precision landing is based on a vehicle pose estimation.

20. The UAS of claim 15, wherein the autonomous precision landing is based on a control method that rejects external disturbances via a three-stage cascaded control architecture.

21. The UAS of claim 15, wherein the processor causes the UAS vehicle to repeat steps (A)-(F) for multiple sorties without any human intervention.

22. The UAS of claim 15, wherein the software further causes the UAS vehicle to autonomously monitor a system health of the UAS.

23. The UAS of claim 22, wherein the software further causes the UAS vehicle to determine that an in-flight emergency has occurred and either return to the take-off landing-charging station or perform an emergency landing dependent upon conditions of the in-flight emergency.

24. The UAS of claim 15, wherein the UAS vehicle comprises:
onboard navigation sensors.

25. The UAS of claim 15, wherein the take-off landing-charging station and the target landing-charging station comprise:

a physical station comprising a weather shelter and weather monitoring sensors for delaying flight operations in adverse conditions.

26. The UAS of claim 15, further comprising:

determining that the UAS vehicle is in a GPS-denied environment; and the UAS vehicle performing precision landing inside a weather shelter using GPS-denied navigation methods.

27. The UAS of claim 15, wherein:

the detecting comprises obtaining a single-pose measurement using all of the multiple tag fiducials at once; and the realigning comprises rotating the UAS to improve an image of the multiple tag fiducials and result in a pad-aligned pose based on the multiple tag fiducials.

28. The UAS of claim 27, wherein:

the calibrating isolates an effect of bundle geometry where a tag bundle geometry and camera-tag distance are the only independent variables;

the multiple tag fiducials comprise a first size tag fiducial of a first size and a second size tag fiducials of a second size;

the second size is larger than the first size;

the second size tag fiducial enables detection from a higher altitude compared to the first size tag fiducial;

placement of multiple first size tag fiducials around the charging area of the target landing-charging station will not obscure the charging area; and the multiple first size tag fiducials are distributed symmetrically about the target landing-charging station.

29. The UAS of claim 15, wherein:
the UAS precision lands using an event based camera that accounts for exposure effects relating to the target landing-charging station.
30. The UAS of claim 15, wherein:
the UAS precision lands using a thermal camera.

* * * * *